(12) United States Patent
Telefus et al.

(10) Patent No.: US 11,363,690 B2
(45) Date of Patent: *Jun. 14, 2022

(54) AC-DRIVEN LIGHT-EMITTING DIODE SYSTEMS

(71) Applicant: Intelesol, LLC, Danville, CA (US)

(72) Inventors: Mark D. Telefus, Orinda, CA (US); Stephen C. Gerber, Austin, TX (US)

(73) Assignee: Intelesol, LLC, Danville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/372,821

(22) Filed: Jul. 12, 2021

(65) Prior Publication Data

US 2021/0345462 A1 Nov. 4, 2021

Related U.S. Application Data

(63) Continuation of application No. 17/032,759, filed on Sep. 25, 2020, now Pat. No. 11,064,586, which is a continuation of application No. 16/718,157, filed on Dec. 17, 2019, now Pat. No. 10,834,792.

(60) Provisional application No. 62/780,377, filed on Dec. 17, 2018, provisional application No. 62/791,014, filed on Jan. 10, 2019.

(51) Int. Cl.
*H05B 45/30* (2020.01)
*H05B 45/305* (2020.01)

(52) U.S. Cl.
CPC ................... *H05B 45/305* (2020.01)

(58) Field of Classification Search
CPC ........ H05B 45/30; H05B 45/44; H05B 45/46; H05B 45/52; H05B 45/54; H05B 45/305
See application file for complete search history.

(56) References Cited

U.S. PATENT DOCUMENTS

| 3,638,102 A | 1/1972 | Pelka |
| 3,777,253 A | 12/1973 | Callan |

(Continued)

FOREIGN PATENT DOCUMENTS

| CN | 109075551 B | 1/2021 |
| EP | 0016646 A1 | 10/1980 |

(Continued)

OTHER PUBLICATIONS

U.S. Appl. No. 17/047,613 filed in the name of Mark Telefus et al. filed Oct. 14, 2020, and entitled "Intelligent Circuit Breakers."

(Continued)

*Primary Examiner* — Tung X Le
(74) *Attorney, Agent, or Firm* — Ryan, Mason & Lewis, LLP

(57) ABSTRACT

AC-driven light-emitting diode systems and methods are provided for driving LED devices (e.g., LED lighting) using AC power. For example, an integrated circuit includes a first power line and a second power line configured for connection to AC power, and a plurality of LED stages, wherein each LED stage comprises multiple serially-connected LED devices, switches connected to inputs and outputs of the LED stages. The integrated circuit further includes switch control circuitry configured to control the switches to selectively connect one or more of the LED stages to the first and second power lines to empower the LED stages with the AC power.

20 Claims, 17 Drawing Sheets

(56) References Cited

U.S. PATENT DOCUMENTS

| | | |
|---|---|---|
| 4,074,345 A | 2/1978 | Ackermann |
| 4,127,895 A | 11/1978 | Krueger |
| 4,245,148 A | 1/1981 | Gisske et al. |
| 4,245,184 A | 1/1981 | Billings et al. |
| 4,245,185 A | 1/1981 | Mitchell et al. |
| 4,257,081 A | 3/1981 | Sauer et al. |
| 4,466,071 A | 8/1984 | Russell, Jr. |
| 4,487,458 A | 12/1984 | Janutka |
| 4,581,540 A | 4/1986 | Guajardo |
| 4,631,625 A | 12/1986 | Alexander et al. |
| 4,636,907 A | 1/1987 | Howell |
| 4,649,302 A | 3/1987 | Damiano et al. |
| 4,653,084 A | 3/1987 | Ahuja |
| 4,682,061 A | 7/1987 | Donovan |
| 4,685,046 A | 8/1987 | Sanders |
| 4,709,296 A | 11/1987 | Hung et al. |
| 4,760,293 A | 7/1988 | Hebenstreit |
| 4,766,281 A | 8/1988 | Buhler |
| 4,812,995 A | 3/1989 | Girgis et al. |
| 4,888,504 A | 12/1989 | Kinzer |
| 5,121,282 A | 6/1992 | White |
| 5,276,737 A | 1/1994 | Micali |
| 5,307,257 A | 4/1994 | Fukushima |
| 5,371,646 A | 12/1994 | Biegelmeier |
| 5,410,745 A | 4/1995 | Friesen et al. |
| 5,559,656 A | 9/1996 | Chokhawala |
| 5,646,514 A | 7/1997 | Tsunetsugu |
| 5,654,880 A | 8/1997 | Brkovic et al. |
| 5,731,732 A | 3/1998 | Williams |
| 5,793,596 A | 8/1998 | Jordan et al. |
| 5,796,274 A | 8/1998 | Willis et al. |
| 5,870,009 A | 2/1999 | Serpinet et al. |
| 5,933,305 A | 8/1999 | Schmalz et al. |
| 6,081,123 A | 6/2000 | Kasbarian et al. |
| 6,111,494 A | 8/2000 | Fischer et al. |
| 6,115,267 A | 9/2000 | Herbert |
| 6,141,197 A | 10/2000 | Kim et al. |
| 6,160,689 A | 12/2000 | Stolzenberg |
| 6,167,329 A | 12/2000 | Engel et al. |
| 6,169,391 B1 | 1/2001 | Lei |
| 6,188,203 B1 | 2/2001 | Rice et al. |
| 6,300,748 B1 | 10/2001 | Miller |
| 6,369,554 B1 | 4/2002 | Aram |
| 6,483,290 B1 | 11/2002 | Hemminger et al. |
| 6,515,434 B1 | 2/2003 | Biebl |
| 6,538,906 B1 | 3/2003 | Ke et al. |
| 6,756,998 B1 | 6/2004 | Bilger |
| 6,788,512 B2 | 9/2004 | Vicente et al. |
| 6,807,035 B1 | 10/2004 | Baldwin et al. |
| 6,813,720 B2 | 11/2004 | Leblanc |
| 6,839,208 B2 | 1/2005 | Macbeth et al. |
| 6,843,680 B2 | 1/2005 | Gorman |
| 6,906,476 B1 | 6/2005 | Beatenbough et al. |
| 6,984,988 B2 | 1/2006 | Yamamoto |
| 7,045,723 B1 | 5/2006 | Projkovski |
| 7,053,626 B2 | 5/2006 | Monter et al. |
| 7,110,225 B1 | 9/2006 | Hick |
| 7,164,238 B2 | 1/2007 | Kazanov et al. |
| 7,297,603 B2 | 11/2007 | Robb et al. |
| 7,304,828 B1 | 12/2007 | Shvartsman |
| D558,683 S | 1/2008 | Pape et al. |
| 7,319,574 B2 | 1/2008 | Engel |
| D568,253 S | 5/2008 | Gorman |
| 7,367,121 B1 | 5/2008 | Gorman |
| 7,586,285 B2 | 9/2009 | Gunji |
| 7,595,680 B2 | 9/2009 | Morita et al. |
| 7,610,616 B2 | 10/2009 | Masuouka et al. |
| 7,633,727 B2 | 12/2009 | Zhou et al. |
| 7,643,256 B2 | 1/2010 | Wright et al. |
| 7,693,670 B2 | 4/2010 | Durling et al. |
| 7,715,216 B2 | 5/2010 | Liu et al. |
| 7,729,147 B1 | 6/2010 | Wong et al. |
| 7,731,403 B2 | 6/2010 | Lynam et al. |
| 7,746,677 B2 | 6/2010 | Unkrich |
| 7,821,023 B2 | 10/2010 | Yuan et al. |
| D638,355 S | 5/2011 | Chen |
| 7,936,279 B2 | 5/2011 | Tang et al. |
| 7,948,719 B2 | 5/2011 | Xu |
| 8,124,888 B2 | 2/2012 | Etemad-Moghadam et al. |
| 8,256,675 B2 | 9/2012 | Baglin et al. |
| 8,374,729 B2 | 2/2013 | Chapel et al. |
| 8,463,453 B2 | 6/2013 | Parsons, Jr. |
| 8,482,885 B2 | 7/2013 | Billingsley et al. |
| 8,560,134 B1 | 10/2013 | Lee |
| 8,649,883 B2 | 2/2014 | Lu et al. |
| 8,664,886 B2 | 3/2014 | Ostrovsky |
| 8,717,720 B2 | 5/2014 | DeBoer |
| 8,718,830 B2 | 5/2014 | Smith |
| 8,781,637 B2 | 7/2014 | Eaves |
| 8,817,441 B2 | 8/2014 | Callanan |
| 8,890,371 B2 | 11/2014 | Gotou |
| D720,295 S | 12/2014 | Dodal et al. |
| 8,947,838 B2 | 2/2015 | Yamai et al. |
| 9,054,587 B2 | 6/2015 | Neyman |
| 9,055,641 B2 | 6/2015 | Shteynberg et al. |
| 9,287,792 B2 | 3/2016 | Telefus et al. |
| 9,325,516 B2 | 4/2016 | Pera et al. |
| 9,366,702 B2 | 6/2016 | Steele et al. |
| 9,439,318 B2 | 9/2016 | Chen |
| 9,443,845 B1 | 9/2016 | Stafanov et al. |
| 9,502,832 B1 | 11/2016 | Ullahkhan et al. |
| 9,509,083 B2 | 11/2016 | Yang |
| 9,515,560 B1 | 12/2016 | Telefus et al. |
| 9,577,420 B2 | 2/2017 | Ostrovsky et al. |
| 9,621,053 B1 | 4/2017 | Telefus |
| 9,774,182 B2 | 9/2017 | Phillips |
| 9,836,243 B1 | 12/2017 | Chanler et al. |
| 9,883,554 B2 * | 1/2018 | Lynch .................. H05B 45/48 |
| D814,424 S | 4/2018 | DeCosta |
| 9,965,007 B2 | 5/2018 | Amelio et al. |
| 9,990,786 B1 | 6/2018 | Ziraknejad |
| 9,991,633 B2 | 6/2018 | Robinet |
| 10,072,942 B2 | 9/2018 | Wootton et al. |
| 10,076,006 B2 * | 9/2018 | Kahlman ............... H05B 45/48 |
| 10,101,716 B2 | 10/2018 | Kim |
| 10,187,944 B2 | 1/2019 | MacAdam et al. |
| 10,469,077 B2 | 11/2019 | Telefus et al. |
| 10,548,188 B2 * | 1/2020 | Cheng ................. H05B 45/395 |
| D879,056 S | 3/2020 | Telefus |
| D881,144 S | 4/2020 | Telefus |
| 10,615,713 B2 | 4/2020 | Telefus et al. |
| 10,645,536 B1 | 5/2020 | Barnes et al. |
| 10,756,662 B2 | 8/2020 | Steiner et al. |
| 10,812,072 B2 | 10/2020 | Telefus et al. |
| 10,812,282 B2 | 10/2020 | Telefus et al. |
| 10,819,336 B2 | 10/2020 | Telefus et al. |
| 10,834,792 B2 | 11/2020 | Telefus et al. |
| 10,887,447 B2 | 1/2021 | Jakobsson et al. |
| 10,931,473 B2 | 2/2021 | Telefus et al. |
| 10,936,749 B2 | 3/2021 | Jakobsson |
| 10,951,435 B2 | 3/2021 | Jakobsson |
| 10,985,548 B2 | 4/2021 | Telefus |
| 10,992,236 B2 | 4/2021 | Telefus et al. |
| 10,993,082 B2 | 4/2021 | Jakobsson |
| 11,050,236 B2 | 6/2021 | Telefus et al. |
| 11,056,981 B2 | 7/2021 | Telefus |
| 2002/0109487 A1 | 8/2002 | Telefus et al. |
| 2003/0052544 A1 | 3/2003 | Yamamoto et al. |
| 2003/0063420 A1 | 4/2003 | Pahl et al. |
| 2003/0151865 A1 | 8/2003 | Maio |
| 2004/0032756 A1 | 2/2004 | Van Den Bossche |
| 2004/0251884 A1 | 12/2004 | Steffie et al. |
| 2005/0162139 A1 | 7/2005 | Hirst |
| 2005/0185353 A1 | 8/2005 | Rasmussen et al. |
| 2005/0286184 A1 | 12/2005 | Campolo |
| 2006/0285366 A1 | 12/2006 | Radecker et al. |
| 2007/0008747 A1 | 1/2007 | Soldano et al. |
| 2007/0143826 A1 | 6/2007 | Sastry et al. |
| 2007/0159745 A1 | 7/2007 | Berberich et al. |
| 2007/0188025 A1 | 8/2007 | Keagy et al. |
| 2007/0236152 A1 | 10/2007 | Davis et al. |
| 2008/0006607 A1 | 1/2008 | Boeder et al. |
| 2008/0136581 A1 | 6/2008 | Heilman et al. |
| 2008/0151444 A1 | 6/2008 | Upton |

(56) References Cited

U.S. PATENT DOCUMENTS

| | | |
|---|---|---|
| 2008/0174922 A1 | 7/2008 | Kimbrough |
| 2008/0180866 A1 | 7/2008 | Wong |
| 2008/0204950 A1 | 8/2008 | Zhou et al. |
| 2008/0234879 A1 | 9/2008 | Fuller et al. |
| 2008/0253153 A1 | 10/2008 | Wu et al. |
| 2008/0281472 A1 | 11/2008 | Podgorny et al. |
| 2009/0034139 A1 | 2/2009 | Martin |
| 2009/0067201 A1 | 3/2009 | Cai |
| 2009/0168273 A1 | 7/2009 | Yu et al. |
| 2009/0195349 A1 | 8/2009 | Frader-Thompson et al. |
| 2009/0203355 A1 | 8/2009 | Clark |
| 2009/0213629 A1 | 8/2009 | Liu et al. |
| 2009/0284385 A1 | 11/2009 | Tang et al. |
| 2010/0091418 A1 | 4/2010 | Xu |
| 2010/0145479 A1 | 6/2010 | Griffiths |
| 2010/0145542 A1 | 6/2010 | Chapel et al. |
| 2010/0156369 A1 | 6/2010 | Kularatna et al. |
| 2010/0188054 A1 | 7/2010 | Asakura et al. |
| 2010/0231135 A1 | 9/2010 | Hum et al. |
| 2010/0231373 A1 | 9/2010 | Romp |
| 2010/0235896 A1 | 9/2010 | Hirsch |
| 2010/0244730 A1 | 9/2010 | Nerone |
| 2010/0261373 A1 | 10/2010 | Roneker |
| 2010/0284207 A1 | 11/2010 | Watanabe et al. |
| 2010/0296207 A1 | 11/2010 | Schumacher et al. |
| 2010/0309003 A1 | 12/2010 | Rousseau |
| 2010/0320840 A1 | 12/2010 | Fridberg |
| 2011/0062936 A1 | 3/2011 | Bartelous |
| 2011/0121752 A1 | 5/2011 | Newman, Jr. et al. |
| 2011/0127922 A1 | 6/2011 | Sauerlaender |
| 2011/0156610 A1 | 6/2011 | Ostrovsky et al. |
| 2011/0273103 A1 | 11/2011 | Hong |
| 2011/0292703 A1 | 12/2011 | Cuk |
| 2011/0299547 A1 | 12/2011 | Diab et al. |
| 2011/0301894 A1 | 12/2011 | Sanderford, Jr. |
| 2011/0305054 A1 | 12/2011 | Yamagiwa et al. |
| 2011/0307447 A1 | 12/2011 | Sabaa et al. |
| 2012/0026632 A1 | 2/2012 | Acharya et al. |
| 2012/0075897 A1 | 3/2012 | Fujita |
| 2012/0089266 A1 | 4/2012 | Tomimbang et al. |
| 2012/0095605 A1 | 4/2012 | Tran |
| 2012/0133289 A1 | 5/2012 | Hum et al. |
| 2012/0275076 A1 | 11/2012 | Shono |
| 2012/0311035 A1 | 12/2012 | Guha et al. |
| 2013/0026925 A1* | 1/2013 | Ven .................. H05B 45/44 315/122 |
| 2013/0051102 A1 | 2/2013 | Huang et al. |
| 2013/0057247 A1 | 3/2013 | Russell et al. |
| 2013/0063851 A1 | 3/2013 | Stevens et al. |
| 2013/0066478 A1 | 3/2013 | Smith |
| 2013/0088160 A1 | 4/2013 | Chai et al. |
| 2013/0104238 A1 | 4/2013 | Balsan et al. |
| 2013/0119958 A1 | 5/2013 | Gasperi |
| 2013/0128396 A1 | 5/2013 | Danesh et al. |
| 2013/0170261 A1 | 7/2013 | Lee et al. |
| 2013/0174211 A1 | 7/2013 | Aad et al. |
| 2013/0187631 A1 | 7/2013 | Russell et al. |
| 2013/0245841 A1 | 9/2013 | Ahn et al. |
| 2013/0253898 A1 | 9/2013 | Meagher et al. |
| 2013/0261821 A1 | 10/2013 | Lu et al. |
| 2013/0265041 A1 | 10/2013 | Friedrich et al. |
| 2013/0300534 A1 | 11/2013 | Myllymaki |
| 2013/0329331 A1 | 12/2013 | Erger et al. |
| 2014/0043732 A1 | 2/2014 | McKay et al. |
| 2014/0067137 A1 | 3/2014 | Amelio et al. |
| 2014/0074730 A1 | 3/2014 | Arensmeier et al. |
| 2014/0085940 A1 | 3/2014 | Lee et al. |
| 2014/0096272 A1 | 4/2014 | Makofsky et al. |
| 2014/0097809 A1 | 4/2014 | Follic et al. |
| 2014/0159593 A1 | 6/2014 | Chu et al. |
| 2014/0164294 A1 | 6/2014 | Osann, Jr. |
| 2014/0203718 A1 | 7/2014 | Yoon et al. |
| 2014/0246926 A1 | 9/2014 | Cruz et al. |
| 2014/0266698 A1 | 9/2014 | Hall et al. |
| 2014/0268935 A1 | 9/2014 | Chiang |
| 2014/0276753 A1 | 9/2014 | Wham et al. |
| 2014/0331278 A1 | 11/2014 | Tkachev |
| 2015/0042274 A1 | 2/2015 | Kim et al. |
| 2015/0055261 A1 | 2/2015 | Lubick et al. |
| 2015/0097430 A1 | 4/2015 | Scruggs |
| 2015/0116886 A1 | 4/2015 | Zehnder et al. |
| 2015/0154404 A1 | 6/2015 | Patel et al. |
| 2015/0155789 A1 | 6/2015 | Freeman et al. |
| 2015/0180469 A1 | 6/2015 | Kim |
| 2015/0185261 A1 | 7/2015 | Frader-Thompson et al. |
| 2015/0185262 A1 | 7/2015 | Song et al. |
| 2015/0216006 A1 | 7/2015 | Lee et al. |
| 2015/0236587 A1 | 8/2015 | Kim et al. |
| 2015/0253364 A1 | 9/2015 | Hieda et al. |
| 2015/0256355 A1 | 9/2015 | Pera et al. |
| 2015/0256665 A1 | 9/2015 | Pera et al. |
| 2015/0282223 A1 | 10/2015 | Wang et al. |
| 2015/0309521 A1 | 10/2015 | Pan |
| 2015/0317326 A1 | 11/2015 | Bandarupalli et al. |
| 2015/0355649 A1 | 12/2015 | Ovadia |
| 2015/0362927 A1 | 12/2015 | Giorgi |
| 2016/0012699 A1 | 1/2016 | Lundy |
| 2016/0018800 A1 | 1/2016 | Gettings et al. |
| 2016/0035159 A1 | 2/2016 | Ganapathy Achari et al. |
| 2016/0057841 A1 | 2/2016 | Lenig |
| 2016/0069933 A1 | 3/2016 | Cook et al. |
| 2016/0077746 A1 | 3/2016 | Muth et al. |
| 2016/0081143 A1 | 3/2016 | Wang |
| 2016/0110154 A1 | 4/2016 | Qureshi et al. |
| 2016/0117917 A1 | 4/2016 | Prakash et al. |
| 2016/0126031 A1 | 5/2016 | Wootton et al. |
| 2016/0178691 A1 | 6/2016 | Simonin |
| 2016/0181941 A1 | 6/2016 | Gratton et al. |
| 2016/0195864 A1 | 7/2016 | Kim |
| 2016/0247799 A1 | 8/2016 | Stafanov et al. |
| 2016/0259308 A1 | 9/2016 | Fadell et al. |
| 2016/0260135 A1 | 9/2016 | Zomet et al. |
| 2016/0277528 A1 | 9/2016 | Guilaume et al. |
| 2016/0294179 A1 | 10/2016 | Kennedy et al. |
| 2016/0343083 A1 | 11/2016 | Hering et al. |
| 2016/0360586 A1 | 12/2016 | Yang et al. |
| 2016/0374134 A1 | 12/2016 | Kweon et al. |
| 2017/0004948 A1 | 1/2017 | Leyh |
| 2017/0019969 A1 | 1/2017 | O'Neil et al. |
| 2017/0026194 A1 | 1/2017 | Vijayrao et al. |
| 2017/0033942 A1 | 2/2017 | Koeninger |
| 2017/0063225 A1 | 3/2017 | Guo et al. |
| 2017/0067961 A1 | 3/2017 | O'Flynn |
| 2017/0086281 A1 | 3/2017 | Avrahamy |
| 2017/0099647 A1 | 4/2017 | Shah et al. |
| 2017/0104325 A1 | 4/2017 | Eriksen et al. |
| 2017/0170730 A1 | 6/2017 | Sugiura |
| 2017/0171802 A1 | 6/2017 | Hou et al. |
| 2017/0179946 A1 | 6/2017 | Turvey |
| 2017/0195130 A1 | 7/2017 | Landow et al. |
| 2017/0212653 A1 | 7/2017 | Kanojia et al. |
| 2017/0230193 A1 | 8/2017 | Apte et al. |
| 2017/0244241 A1 | 8/2017 | Wilson et al. |
| 2017/0256934 A1 | 9/2017 | Kennedy et al. |
| 2017/0256941 A1 | 9/2017 | Bowers et al. |
| 2017/0256956 A1 | 9/2017 | Irish et al. |
| 2017/0277709 A1 | 9/2017 | Strauss et al. |
| 2017/0314743 A1 | 11/2017 | Del Castillo et al. |
| 2017/0322049 A1 | 11/2017 | Wootton et al. |
| 2017/0322258 A1 | 11/2017 | Miller et al. |
| 2017/0338809 A1 | 11/2017 | Stefanov et al. |
| 2017/0347415 A1 | 11/2017 | Cho et al. |
| 2017/0366950 A1 | 12/2017 | Arbon |
| 2018/0026534 A1 | 1/2018 | Turcan |
| 2018/0054460 A1 | 2/2018 | Brady et al. |
| 2018/0054862 A1 | 2/2018 | Takagimoto et al. |
| 2018/0061158 A1 | 3/2018 | Greene |
| 2018/0146369 A1 | 5/2018 | Kennedy, Jr. |
| 2018/0174076 A1 | 6/2018 | Fukami |
| 2018/0196094 A1 | 7/2018 | Fishburn et al. |
| 2018/0201302 A1 | 7/2018 | Sonoda et al. |
| 2018/0254959 A1 | 9/2018 | Mantyjarvi et al. |
| 2018/0285198 A1 | 10/2018 | Dantkale et al. |
| 2018/0287802 A1 | 10/2018 | Brickell |

(56) References Cited

U.S. PATENT DOCUMENTS

| | | |
|---|---|---|
| 2018/0301006 A1 | 10/2018 | Flint et al. |
| 2018/0307609 A1 | 10/2018 | Qiang et al. |
| 2018/0342329 A1 | 11/2018 | Rufo et al. |
| 2018/0359039 A1 | 12/2018 | Daoura et al. |
| 2018/0359223 A1 | 12/2018 | Maier et al. |
| 2019/0003855 A1 | 1/2019 | Wootton et al. |
| 2019/0020477 A1 | 1/2019 | Antonatos et al. |
| 2019/0028869 A1 | 1/2019 | Kaliner |
| 2019/0036928 A1 | 1/2019 | Meriac et al. |
| 2019/0050903 A1 | 2/2019 | DeWitt et al. |
| 2019/0052174 A1 | 2/2019 | Gong |
| 2019/0068716 A1 | 2/2019 | Lauer |
| 2019/0086979 A1 | 3/2019 | Kao et al. |
| 2019/0087835 A1 | 3/2019 | Schwed et al. |
| 2019/0104138 A1 | 4/2019 | Storms et al. |
| 2019/0122834 A1 | 4/2019 | Wootton et al. |
| 2019/0140640 A1 | 5/2019 | Telefus et al. |
| 2019/0165691 A1 | 5/2019 | Telefus et al. |
| 2019/0207375 A1 | 7/2019 | Telefus et al. |
| 2019/0238060 A1 | 8/2019 | Telefus et al. |
| 2019/0245457 A1 | 8/2019 | Telefus et al. |
| 2019/0253243 A1 | 8/2019 | Zimmerman et al. |
| 2019/0268176 A1 | 8/2019 | Pognant |
| 2019/0280887 A1 | 9/2019 | Telefus et al. |
| 2019/0306953 A1 | 10/2019 | Joyce et al. |
| 2019/0334999 A1 | 10/2019 | Ryhorchuk et al. |
| 2019/0355014 A1 | 11/2019 | Gerber |
| 2019/0372331 A1 | 12/2019 | Liu et al. |
| 2020/0007126 A1 | 1/2020 | Telefus et al. |
| 2020/0014301 A1 | 1/2020 | Telefus |
| 2020/0014379 A1 | 1/2020 | Telefus |
| 2020/0044883 A1 | 2/2020 | Telefus et al. |
| 2020/0052607 A1 | 2/2020 | Telefus et al. |
| 2020/0053100 A1 | 2/2020 | Jakobsson |
| 2020/0106259 A1 | 4/2020 | Telefus |
| 2020/0106260 A1 | 4/2020 | Telefus |
| 2020/0106637 A1 | 4/2020 | Jakobsson |
| 2020/0120202 A1 | 4/2020 | Jakobsson et al. |
| 2020/0145247 A1 | 5/2020 | Jakobsson |
| 2020/0153245 A1 | 5/2020 | Jakobsson et al. |
| 2020/0159960 A1 | 5/2020 | Jakobsson |
| 2020/0193785 A1 | 6/2020 | Berglund et al. |
| 2020/0196110 A1 | 6/2020 | Jakobsson |
| 2020/0196412 A1 | 6/2020 | Telefus et al. |
| 2020/0260287 A1 | 8/2020 | Hendel |
| 2020/0275266 A1 | 8/2020 | Jakobsson |
| 2020/0287537 A1 | 9/2020 | Telefus et al. |
| 2020/0314233 A1 | 10/2020 | Mohalik et al. |
| 2020/0328694 A1 | 10/2020 | Telefus et al. |
| 2020/0344596 A1 | 10/2020 | Dong et al. |
| 2020/0365345 A1 | 11/2020 | Telefus et al. |
| 2020/0365346 A1 | 11/2020 | Telefus et al. |
| 2020/0365356 A1 | 11/2020 | Telefus et al. |
| 2020/0366078 A1 | 11/2020 | Telefus et al. |
| 2020/0366079 A1 | 11/2020 | Telefus et al. |
| 2020/0394332 A1 | 12/2020 | Jakobsson et al. |
| 2021/0014947 A1 | 1/2021 | Telefus et al. |
| 2021/0119528 A1 | 4/2021 | Telefus |
| 2021/0173364 A1 | 6/2021 | Telefus et al. |
| 2021/0182111 A1 | 6/2021 | Jakobsson |

FOREIGN PATENT DOCUMENTS

| | | |
|---|---|---|
| EP | 0398026 A2 | 11/1990 |
| EP | 2560063 A1 | 2/2013 |
| GB | 2458699 A | 9/2009 |
| JP | 06-053779 A | 2/1994 |
| JP | 2013230034 A | 11/2013 |
| JP | 2014030355 A | 2/2014 |
| WO | 2010110951 A1 | 9/2010 |
| WO | 2016010529 A1 | 1/2016 |
| WO | 2016110833 A2 | 7/2016 |
| WO | 2017196571 A1 | 11/2017 |
| WO | 2017196572 A1 | 11/2017 |
| WO | 2017196649 A1 | 11/2017 |
| WO | 2018075726 A1 | 4/2018 |
| WO | 2018080604 A1 | 5/2018 |
| WO | 2018080614 A1 | 5/2018 |
| WO | 2018081619 A2 | 5/2018 |
| WO | 2018081619 A3 | 5/2018 |
| WO | 2018159914 A1 | 9/2018 |
| WO | 2019133110 A1 | 7/2019 |
| WO | 2020014158 A1 | 1/2020 |
| WO | 2020014161 A1 | 1/2020 |
| WO | PCT/US19/54102 | 2/2020 |
| WO | 2020072516 A1 | 4/2020 |
| WO | PCT/US19/67004 | 4/2020 |
| WO | 2020131977 A1 | 6/2020 |
| WO | PCT/US20/33421 | 9/2020 |
| WO | 2020236726 A1 | 11/2020 |
| WO | PCT/US21/14320 | 4/2021 |
| WO | 2021112870 A1 | 6/2021 |

OTHER PUBLICATIONS

U.S. Appl. No. 17/154,625 filed in the name of Mark Telefus et al. filed Jan. 21, 2021, and entitled "Intelligent Circuit Interruption."

U.S. Appl. No. 17/224,067 filed in the name of Mark Telefus et al. filed Apr. 6, 2021, and entitled "Solid-State Line Disturbance Circuit Interrupter."

U.S. Appl. No. 63/064,399 filed in the name of Mark Telefus et al. filed Aug. 11, 2020, and entitled "Energy Traffic Monitoring and Control System."

F. Stajano et al., "The Resurrecting Duckling: Security Issues for Ad-hoc Wireless Networks," International Workshop on Security Protocols, 1999, 11 pages.

L. Sweeney, "Simple Demographics Often Identify People Uniquely," Carnegie Mellon University, Data Privacy Working Paper 3, 2000, 34 pages.

A. Narayanan et al., "Robust De-anonymization of Large Sparse Datasets," IEEE Symposium on Security and Privacy, May 2008, 15 pages.

M. Alahmad et al., "Non-Intrusive Electrical Load Monitoring and Profiling Methods for Applications in Energy Management Systems," IEEE Long Island Systems, Applications and Technology Conference, 2011, 7 pages.

K. Yang et al. "Series Arc Fault Detection Algorithm Based on Autoregressive Bispecturm Analysis," Algorithms, vol. 8, Oct. 16, 2015, pp. 929-950.

J.-E. Park et al., "Design on Topologies for High Efficiency Two-Stage AC-DC Converter," 2012 IEEE 7th International Power Electronics and Motion Control Conference—ECCE Asia, Jun. 2-5, 2012, China, 6 pages.

S. Cuk, "98% Efficient Single-Stage AC/DC Converter Topologies," Power Electronics Europe, Issue 4, 2011, 6 pages.

E. Carvou et al., "Electrical Arc Characterization for Ac-Arc Fault Applications," 2009 Proceedings of the 55th IEEE Holm Conference on Electrical Contacts, IEEE Explore Oct. 9, 2009, 6 pages.

C. Restrepo, "Arc Fault Detection and Discrimination Methods," 2007 Proceedings of the 53rd IEEE Holm Conference on Electrical Contacts, IEEE Explore Sep. 24, 2007, 8 pages.

K. Eguchi et al., "Design of a Charge-Pump Type AC-DC Converter for RF-ID Tags," 2006 International Symposium on Communications and Information Technologies, F4D-3, IEEE, 2006, 4 pages.

A. Ayari et al., "Active Power Measurement Comparison Between Analog and Digital Methods," International Conference on Electrical Engineering and Software Applications, 2013, 6 pages.

G. D. Gregory et al., "The Arc-Fault Circuit Interrupter, an Emerging Product," IEEE, 1998, 8 pages.

D. Irwin et al., "Exploiting Home Automation Protocols for Load Monitoring in Smart Buildings," BuildSys '11 Proceedings of the Third ACM Workshop on Embedded Sensing Systems for Energy-Efficiency in Buildings, Nov. 2011, 6 pages.

B. Mrazovac et al., "Towards Ubiquitous Smart Outlets for Safety and Energetic Efficiency of Home Electric Appliances," 2011 IEEE International Conference on Consumer Electronics, Berlin, German, Sep. 6-8, 2011, 5 pages.

(56) References Cited

OTHER PUBLICATIONS

J. K. Becker et al., "Tracking Anonymized Bluetooth Devices," Proceedings on Privacy Enhancing Technologies, vol. 3, 2019, pp. 50-65.
H. Siadati et al., "Mind your SMSes: Mitigating Social Engineering in Second Factor Authentication," Computers & Security, vol. 65, Mar. 2017, 12 pages.
S. Jerde, "The New York Times Can Now Predict Your Emotions and Motivations After Reading a Story," https://www.adweek.com/tv-video/the-new-york-times-can-now-predict-your-emotions-and-motivations-after-reading-a-story/, Apr. 29, 2019, 3 pages.
K. Mowery et al., "Pixel Perfect: Fingerprinting Canvas in HTML5," Proceedings of W2SP, 2012, 12 pages.
S. Kamkar, "Evercookie," https://samy.pl/evercookie/, Oct. 11, 2010, 5 pages.
M. K. Franklin et al., "Fair Exchange with a Semi-Trusted Third Party," Association for Computing Machinery, 1997, 6 pages.
J. Camenisch et al., "Digital Payment Systems with Passive Anonymity-Revoking Trustees," Journal of Computer Security, vol. 5, No. 1, 1997, 11 pages.
L. Coney et al., "Towards a Privacy Measurement Criterion for Voting Systems," Proceedings of the 2005 National Conference on Digital Government Research, 2005, 2 pages.
L. Sweeney, "k-anonymity: A Model for Protecting Privacy," International Journal of Uncertainty, Fuzziness and Knowledge-Based Systems, vol. 1, No. 5, 2002, 14 pages.
C. Dwork, "Differential Privacy," Encyclopedia of Cryptography and Security, 2011, 12 pages.
A. P. Felt et al., "Android Permissions: User Attention, Comprehension, and Behavior," Symposium on Usable Privacy and Security, Jul. 11-13, 2012, 14 pages.
S. Von Solms et al., "On Blind Signatures and Perfect Crimes," Computers & Security, vol. 11, No. 6, 1992, 3 pages.
R. Wyden, "Wyden Releases Discussion Draft of Legislation to Provide Real Protections for Americans' Privacy," https://www.wyden.senate.gov/news/press-releases/wyden-releases-discussion-draft-of-legislation-to-provide-real-protections-for-americans-privacy, Nov. 1, 2018, 3 pages.
M. Rubio, "Rubio Introduces Privacy Bill to Protect Consumers While Promoting Innovation," https://www.rubio.senate.gov/public/index.cfm/2019/1/rubio-introduces-privacy-bill-to-protect-consumers-while-promoting-innovation#:%7E:text=Washingt%E2%80%A6, Jan. 16, 2019, 2 pages.
C. Dwork et al., "Differential Privacy and Robust Statistics," 41st ACM Symposium on Theory of Computing, 2009, 10 pages.
J. Camenisch et al., "Compact E-Cash," Eurocrypt, vol. 3494, 2005, pp. 302-321.
D. L. Chaum, "Untraceable Electronic Mail, Return Addresses, and Digital Pseudonyms," Communications of the ACM, vol. 24, No. 2, Feb. 1981, pp. 84-88.
J. Camenisch et al., "An Efficient System for Nontransferable Anonymous Credentials With Optional Anonymity Revocation," International Conference on the Theory and Application of Cryptographic Techniques, May 6-10, 2001, 30 pages.
M. K. Reiter et al., "Crowds: Anonymity for Web Transactions," ACM Transactions on Information and System Security, vol. 1, 1997, 23 pages.
I. Clarke et al., "Freenet: A Distributed Anonymous Information Storage and Retrieval System," International Workshop on Designing Privacy Enhancing Technologies: Design Issues in Anonymity and Unobservability, 2001, 21 pages.
P. Golle et al., "Universal Re-encryption for Mixnets," Lecture Notes in Computer Science, Feb. 2004, 15 pages.
Y. Lindell et al., "Multiparty Computation for Privacy Preserving Data Mining," Journal of Privacy and Confidentiality, May 6, 2008, 39 pages.
J. Hollan et al., "Distributed Cognition: Toward a New Foundation for Human-Computer Interaction Research," ACM Transactions on Computer-Human Interaction, vol. 7, No. 2, Jun. 2000, pp. 174-196.
A. Adams et al., "Users are Not the Enemy," Communications of the ACM, Dec. 1999, 6 pages.
A. Morton et al., "Privacy is a Process, Not a Pet: a Theory for Effective Privacy Practice," Proceedings of the 2012 New Security Paradigms Workshop, Sep. 2012, 18 pages.
G. D. Abowd et al., "Charting Past, Present and Future Research in Ubiquitous Computing," ACM Transactions on Computer-Human Interaction, vol. 7, No. 1, Mar. 2000, pp. 29-58.
W. Mason et al., "Conducting Behavioral Research on Amazon's Mechanical Turk," Behavior Research Methods, Jun. 2011, 23 pages.
G. M. Gray et al., "Dealing with the Dangers of Fear: The Role of Risk Communication," Health Affairs, Nov. 2002, 11 pages.
L. Shengyuan et al., "Instantaneous Value Sampling AC-DC Converter and its Application in Power Quantity Detection," 2011 Third International Conference on Measuring Technology and Mechatronics Automation, Jan. 6-7, 2011, 4 pages.
H.-H. Chang et al., "Load Recognition for Different Loads with the Same Real Power and Reactive Power in a Non-intrusive Load-monitoring System," 2008 12th International Conference on Computer Supported Cooperative Work in Design, Apr. 16-18, 2008, 6 pages.

\* cited by examiner

200

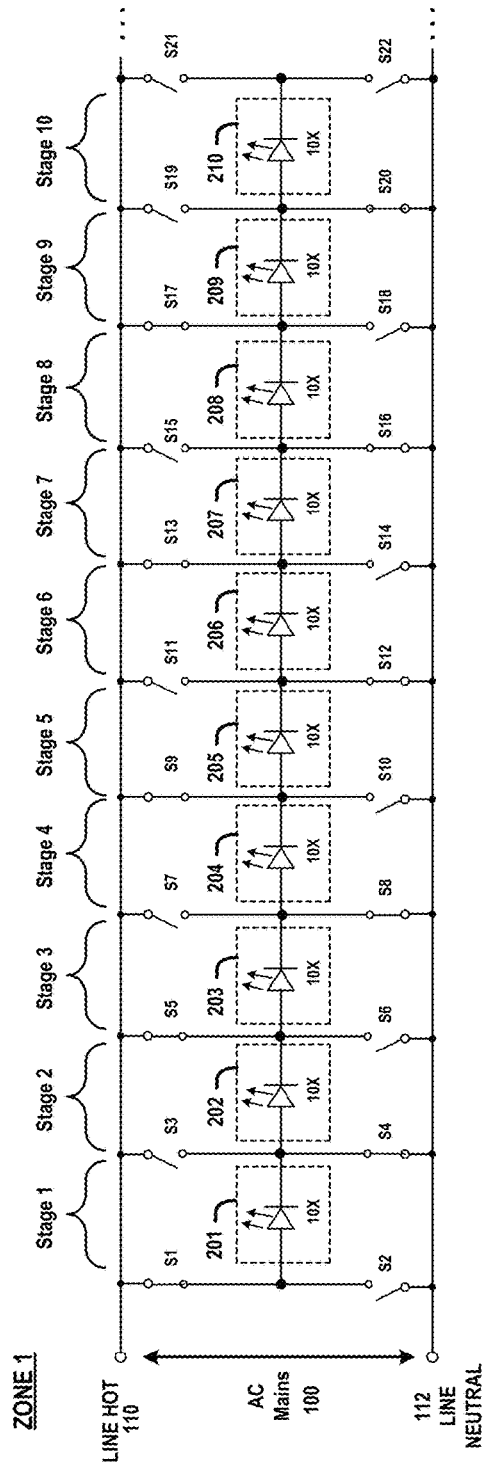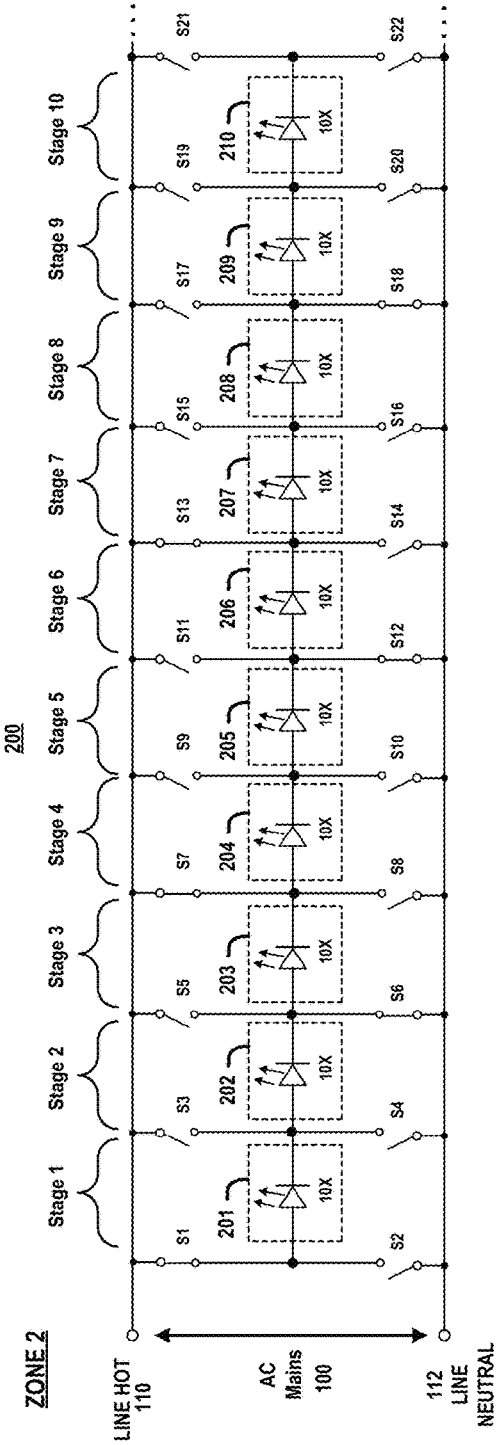

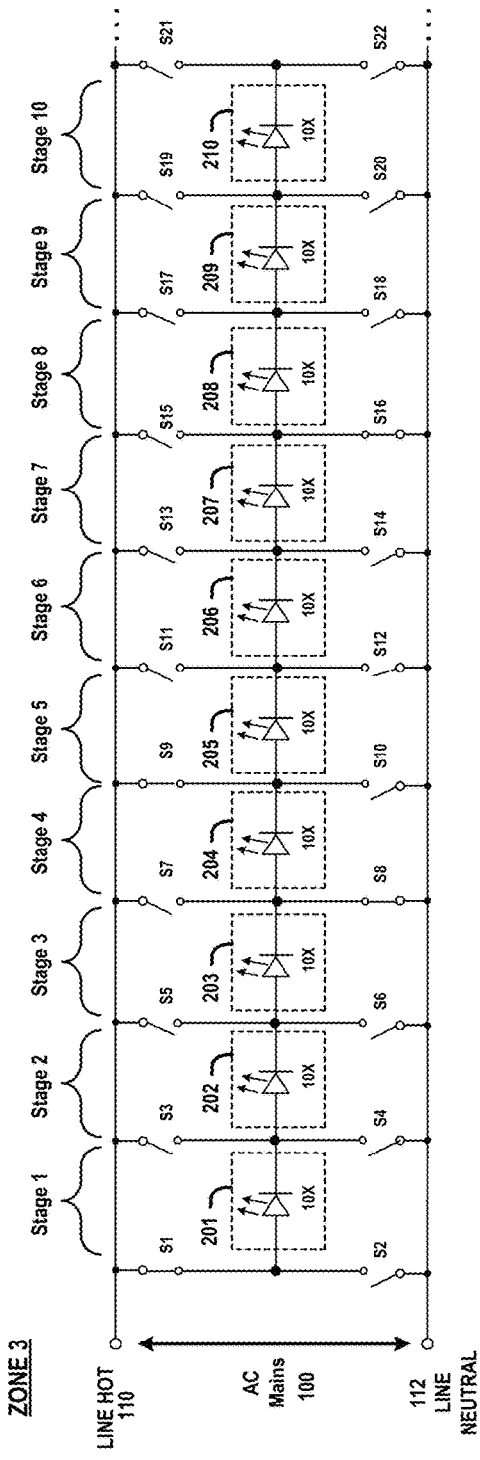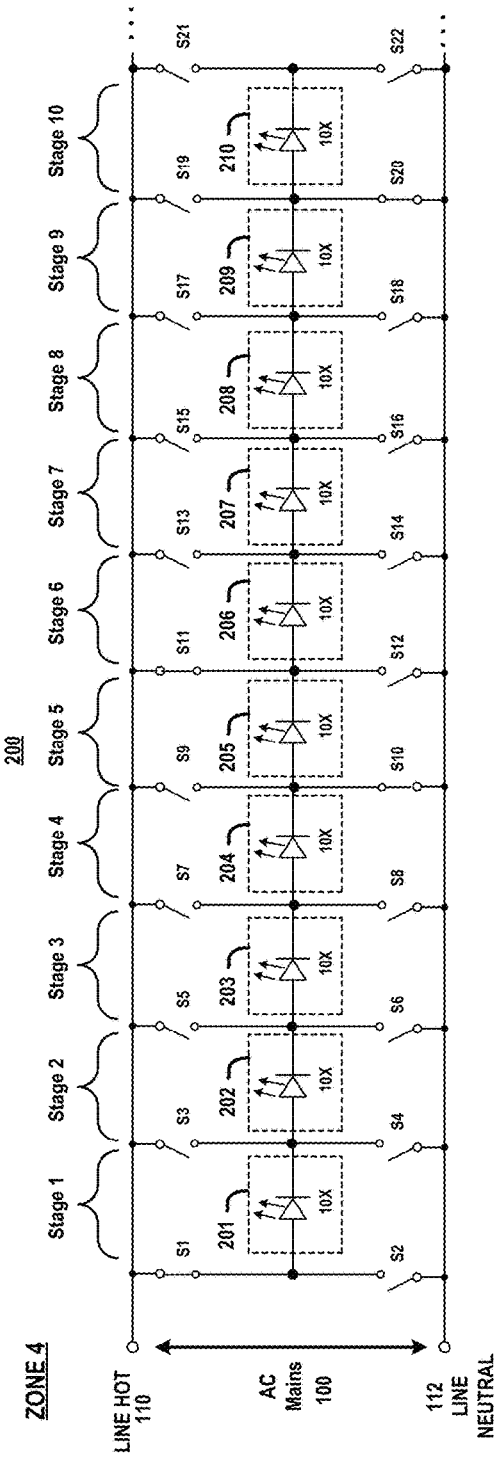

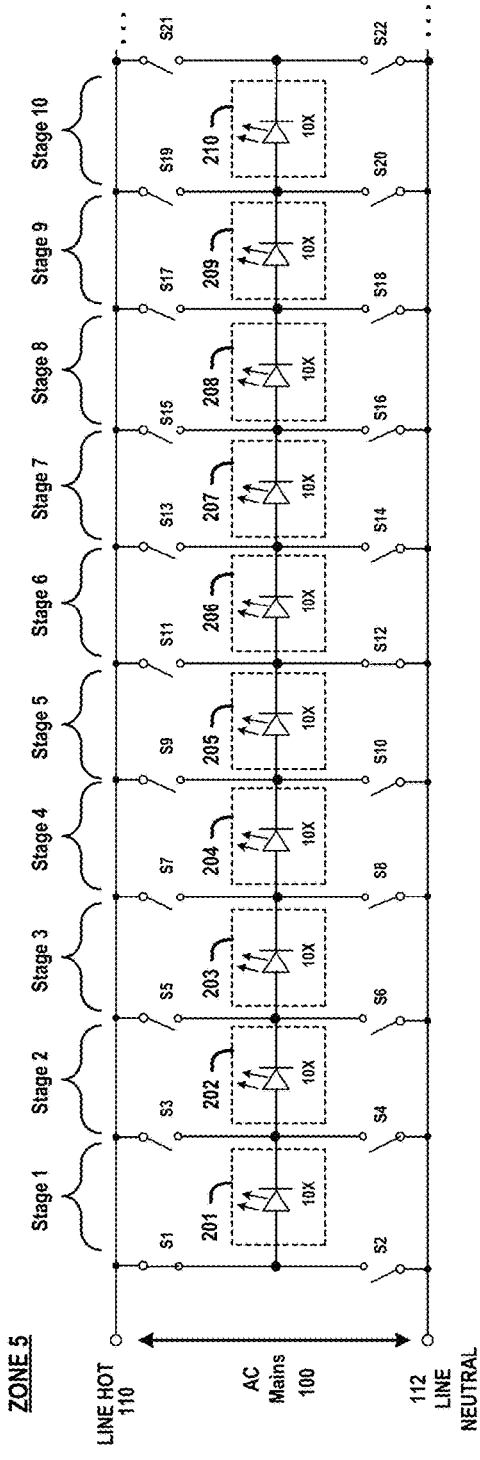
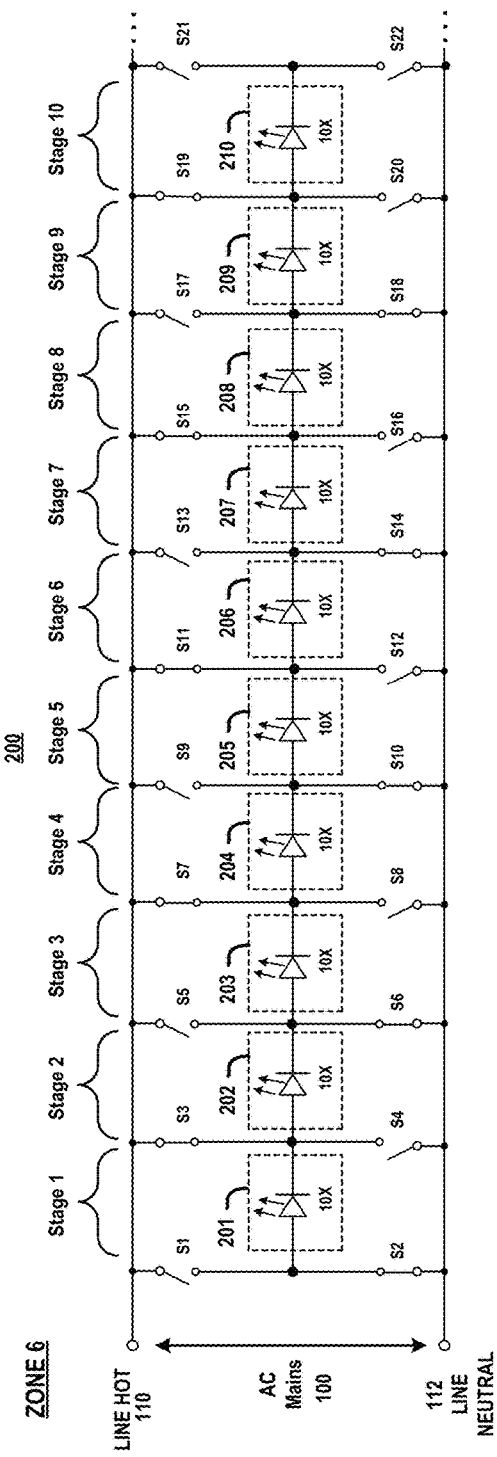

200

200

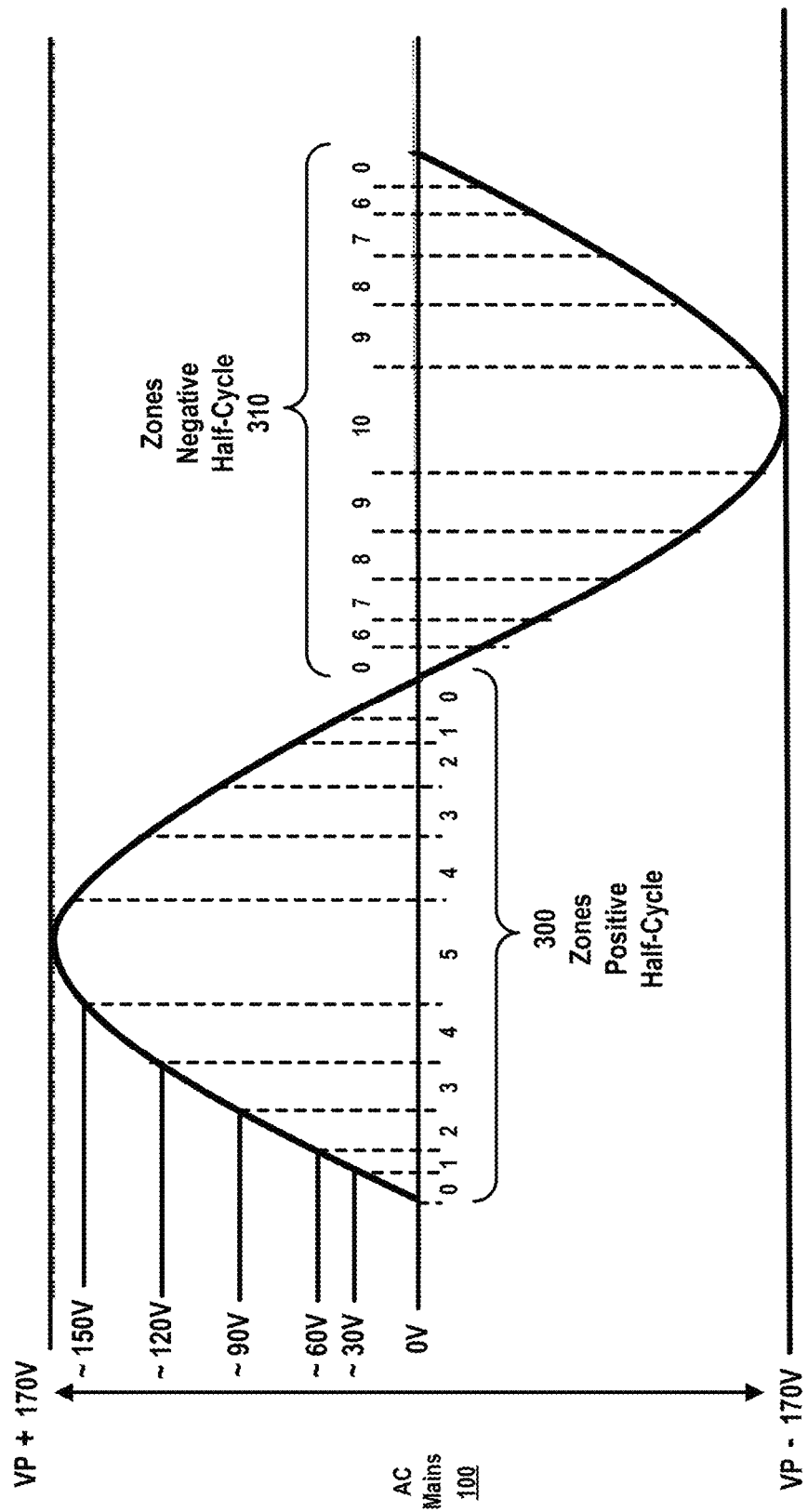

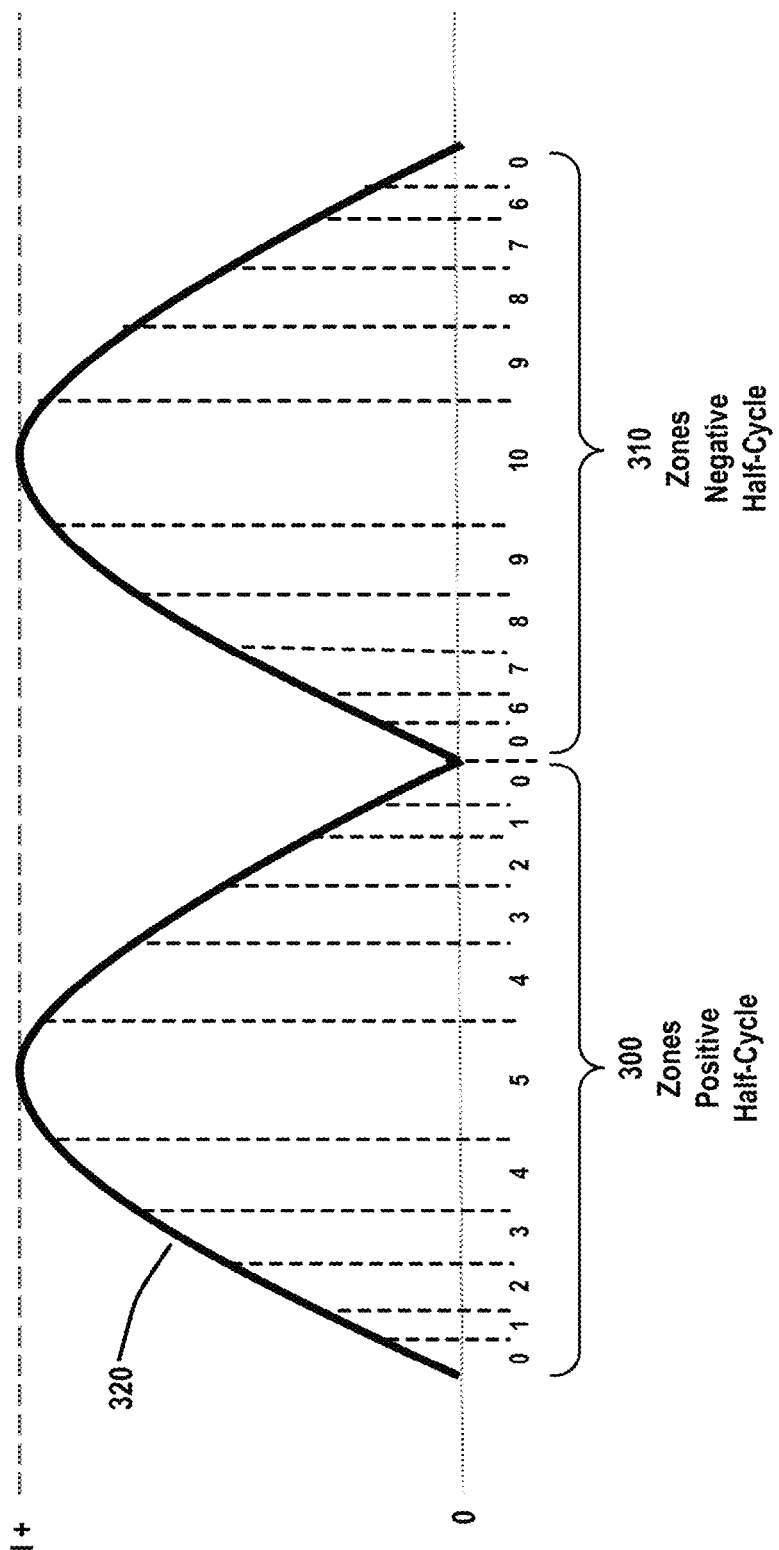

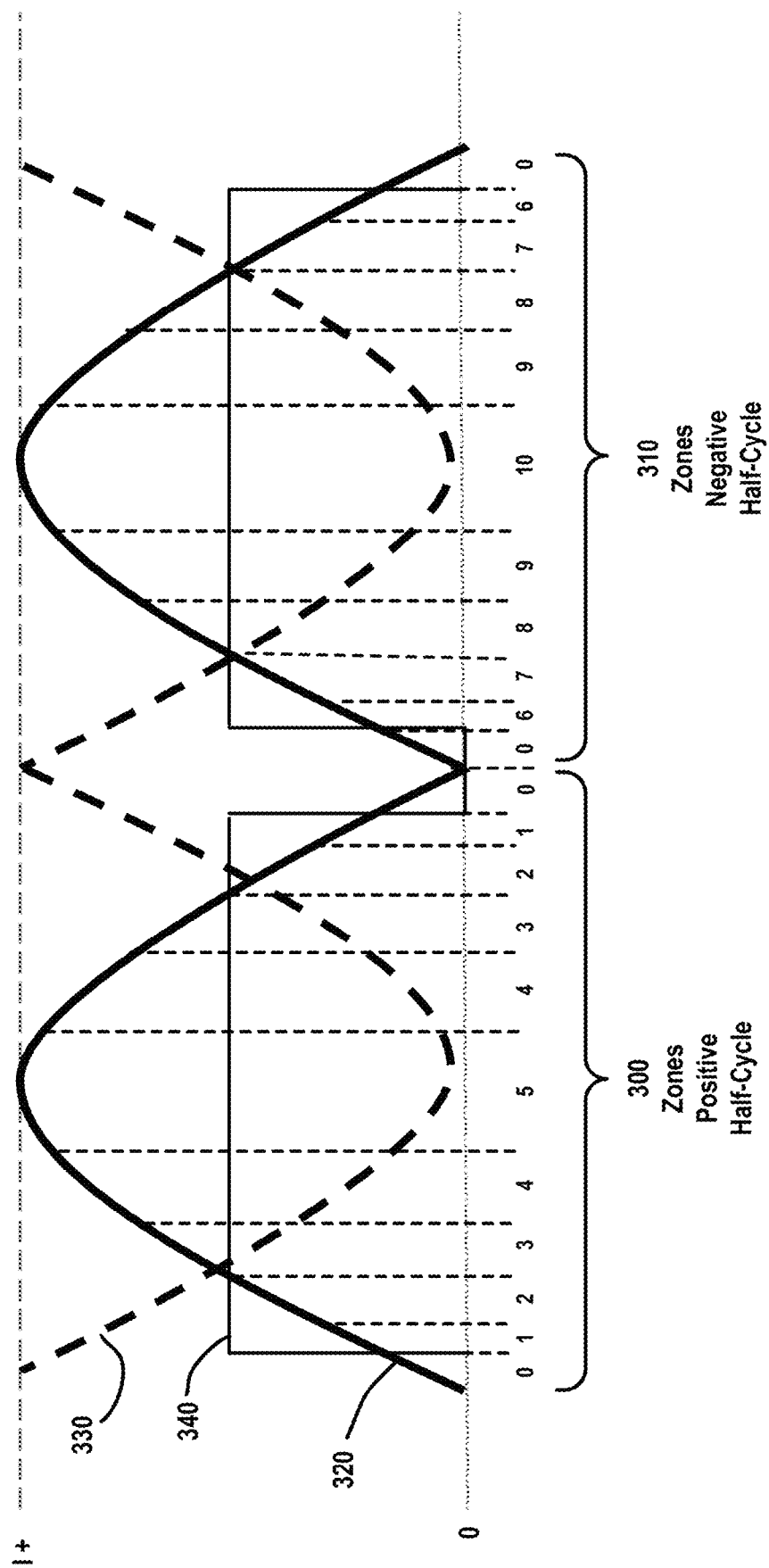

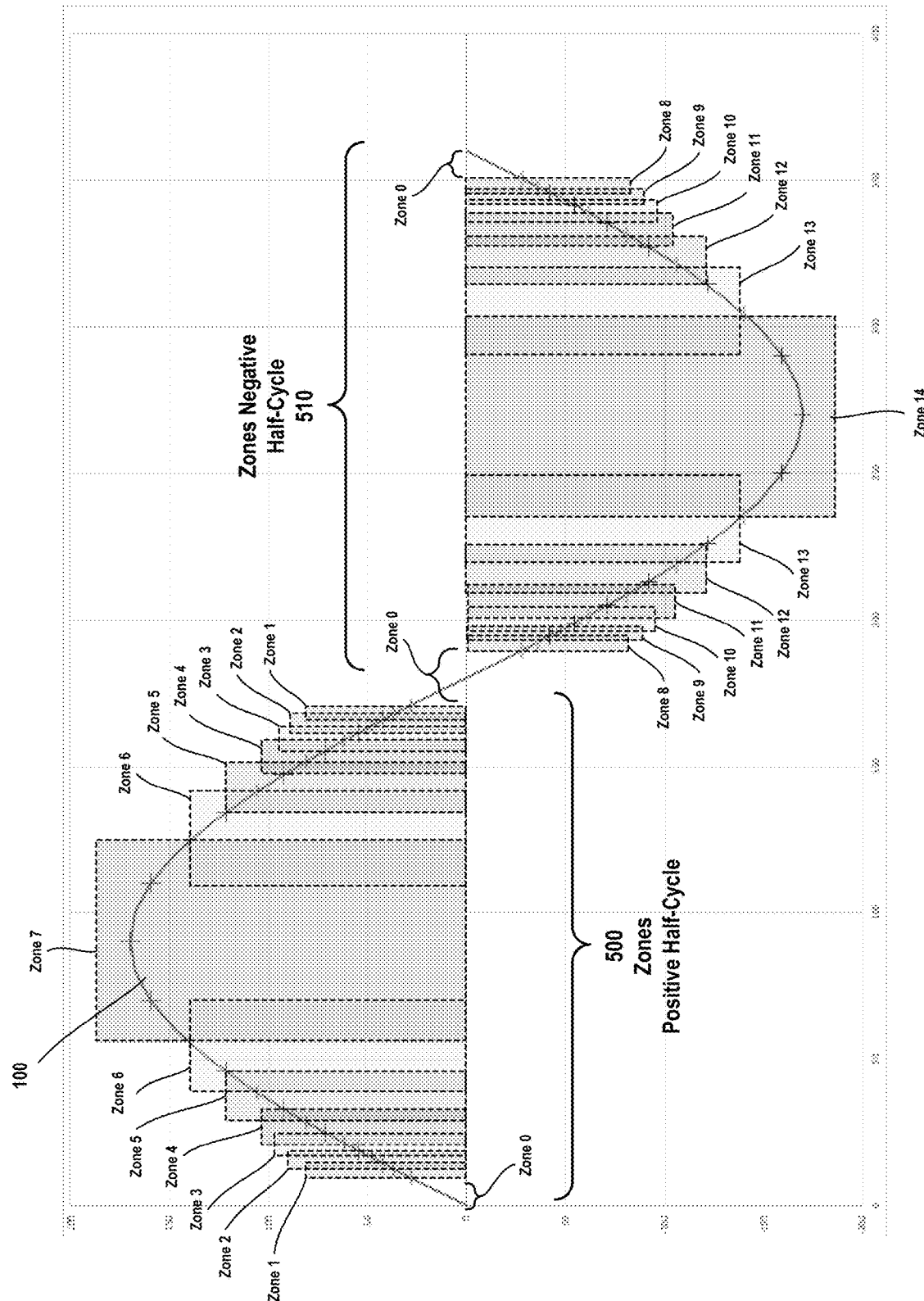

900

US 11,363,690 B2

AC-DRIVEN LIGHT-EMITTING DIODE SYSTEMS

CROSS-REFERENCE TO RELATED APPLICATIONS

This application claims priority to U.S. patent application Ser. No. 17/032,759, filed on Sep. 25, 2020, now U.S. Pat. No. 11,064,586, which claims priority to U.S. patent application Ser. No. 16/718,157, filed on Dec. 17, 2019, now U.S. Pat. No. 10,834,792, which claims priority to U.S. Provisional Application Ser. No. 62/780,377, filed on Dec. 17, 2018, entitled AC-Direct LED Driver, and to U.S. Provisional Application Ser. No. 62/791,014, filed Jan. 10, 2019, entitled Monolithically Processed Light Generator, the disclosures of which are all fully incorporated herein by reference.

TECHNICAL FIELD

This disclosure relates generally to light-emitting diode (LED) lighting systems and in particular, techniques for driving LEDs of an LED lighting system.

BACKGROUND

LED lighting systems are becoming increasingly popular for use in buildings and homes as a next-generation lighting solution to replace less efficient incandescent and fluorescent lighting systems. However, LED lighting suffers from energy conversion inefficiency, and bothersome flicker when used with dimmers. In addition, conventional LED lighting is powered using direct-current (DC) power, which requires the use of expensive, bulky, and electromagnetically noisy transformer-based power conversion from AC mains to DC power.

SUMMARY

Embodiments of the disclosure include AC-driven LED systems and methods for driving LED devices (e.g., LED lighting) using AC power.

For example, an embodiment of the disclosure includes an integrated circuit which comprises: a first power line and a second power line configured for connection to AC power; a plurality of LED stages, wherein each LED stage comprises a plurality of serially-connected LED devices; a plurality of switches connected to inputs and outputs of the LED stages; and switch control circuitry configured to control the plurality of switches to selectively connect one or more of the LED stages to the first and second power lines to empower the LED stages with the AC power.

Another embodiment of the disclosure comprises a method for driving LEDs using AC power. The method comprises applying AC power to first and second power lines; and controlling a plurality of switches to selectively connect one or more LED stages of a plurality of LED stages to the first and second power lines to empower the LED stages with the AC power, wherein each LED stage comprises a plurality of serially-connected LED devices.

Another embodiment includes a light generating device. The light generating device comprises a semiconductor wafer comprising a monolithic integrated circuit. The monolithic integrated circuit comprises: AC power input terminals configured for connection to an AC power source, and a first power line and a second power line coupled to respective ones of the AC power input terminals; a plurality of LED stages, wherein each LED stage comprises a plurality of serially-connected LED devices; switching circuitry comprising a plurality of switches connected to inputs and outputs of the LED stages; and switch control circuitry configured to control the plurality of switches to selectively connect at least two LED stages to the first and second power lines to empower the LED stages with AC power from the AC power source.

Other embodiments will be described in the following detailed description of embodiments, which is to be read in conjunction with the accompanying figures.

BRIEF DESCRIPTION OF THE DRAWINGS

FIG. 2A-2K schematically illustrate an LED circuit according to an exemplary embodiment of the disclosure, and various switching states of switches of the LED circuit.

FIG. 3A illustrates an exemplary AC voltage waveform which is applied to the LED circuit of FIGS. 2A-2K, wherein the AC voltage waveform is shown to be divided into a plurality of zones in positive and negative half-cycles of the AC waveform, according to an exemplary embodiment of the disclosure.

FIG. 3B schematically illustrates a rectified current waveform of the LED circuit of FIGS. 2A-2K, wherein the rectified current waveform is shown divided into the plurality of zones shown in FIG. 3A, according to an exemplary embodiment of the invention.

FIG. 3C schematically illustrates an exemplary process to achieve a constant brightness by activating a number of LEDs in each zone in a manner that is inversely proportional to the magnitude of the current shown in FIG. 3B.

FIG. 5A is a table that illustrates various switching states of switches in the LED circuit of FIG. 4 over fourteen different and overlapping zones of an AC voltage waveform that is used to drive the LED circuit, according to an exemplary embodiment of the disclosure.

FIG. 5B shows one full cycle of an exemplary AC voltage waveform that is used to drive the LED circuit of FIG. 4 with overlapping zones as shown in the table of FIG. 5A.

DETAILED DESCRIPTION OF EXEMPLARY EMBODIMENTS

Embodiments of the disclosure will now be described in further detail with regard to AC-driven LED systems and methods for driving LED devices (e.g., LED lighting) using AC power. It is to be understood that same or similar reference numbers are used throughout the drawings to denote the same or similar features, elements, or structures, and thus, a detailed explanation of the same or similar features, elements, or structures will not be repeated for each of the drawings. In addition, the terms "about" or "substantially" as used herein with regard to percentages, ranges, etc., are meant to denote being close or approximate to, but not exactly the same. For example, the term "about" or "substantially" as used herein implies that a small margin of error is present, such as 1% or less than the stated amount. The term "exemplary" as used herein means "serving as an example, instance, or illustration". Any embodiment or design described herein as "exemplary" is not to be construed as preferred or advantageous over other embodiments or designs.

Figure 1:
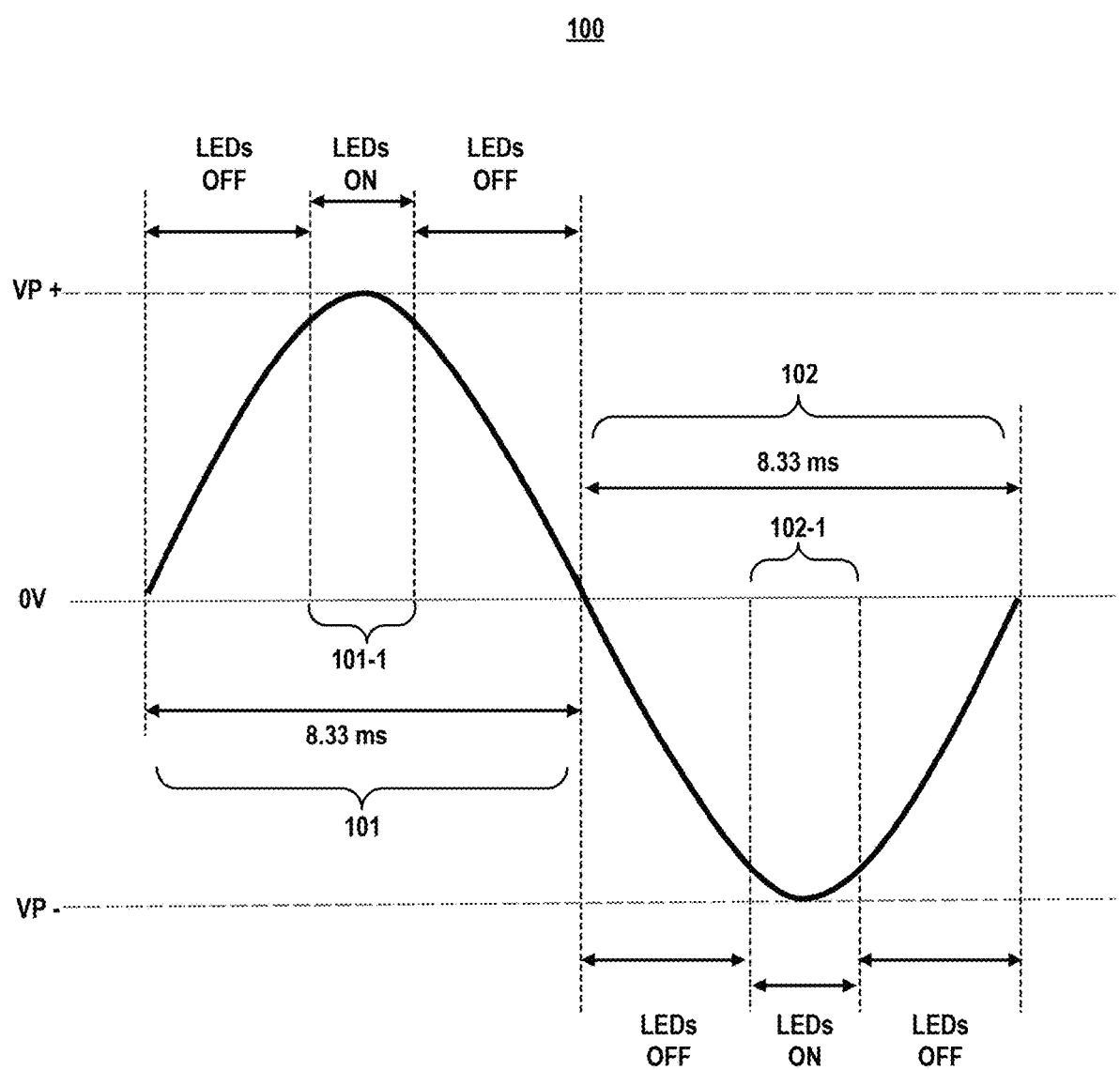
FIG. 1 schematically illustrates an exemplary AC waveform of utility supply power that is used to drive LED lighting.

FIG. 1 schematically illustrates an exemplary AC waveform 100 of utility supply power (referred to herein as AC mains) that is used to drive LED lighting. The AC waveform 100 comprises a sine wave with respective positive and negative half-cycles 101 and 102. The AC waveform has a positive peak voltage VP+ in the positive half-cycle 101, and a negative peak voltage VP− in the negative half-cycle, and voltage zero-crossings (0V). For example, for utility power of 120 V RMS, the positive peak voltage VP+ is about 170V and the negative peak voltage VP− is about −170V. The exemplary AC waveform 100 is illustratively a 60 Hz signal with a period of about 16.66 milliseconds, wherein each half-cycle 101 and 102 has a duration of about 8.33 milliseconds.

Furthermore, FIG. 1 schematically illustrates a conventional method for driving LED devices using AC-to-DC conversion of the peak portions 101-1 and 102-1 of the respective positive and negative half-cycles 101 and 102 of the AC waveform 100. More specifically, in a conventional LED lighting system, an AC-to-DC LED driver is used to drive LED devices with DC voltage which is derived from the peak portions of AC main signal 100. This results in lengthy periods of darkness that may or may not be visible. In this regard, conventional LED lighting inefficiently converts high-voltage AC mains to DC with unreliable, costly, heavy magnetics, transformers, and bulky unreliable capacitors, whereby the usable portion of the AC main cycle is limited resulting in relatively long periods of darkness, and added difficulty in providing low levels of dimming without flicker.

LEDs are DC current-source driven devices that are seemingly incompatible with high-voltage AC such as 120 and 240 Vrms utility sources. However, in accordance with embodiments of the disclosure, voltage level or time from zero-crossing switched LED strings of correspondingly varied lengths in series and parallel can be made to be directly compatible with high-voltage AC sources. DC devices, such as low-voltage integrated circuits and diodes, have an operable range of input voltage and can survive connection to high voltage AC sources during the voltage window that corresponds to the allowable input voltage range. For example, a typical LED used for lighting has a nominal operating voltage of 3.5 Volts and an allowable operating range from 2.8 to 4.2 Volts. A string of 10 LEDs, as an example, can be operable from 28 to 42 Volt levels of the AC source. Multiple strings of LEDs continually added in series gradually support correspondingly higher and higher voltages. Alternatively, the switching circuits can be configured to shed energy during each zone such that the current is constant and the voltage variation is consumed by a switching current source instead of stressing the LEDs.

Figure 2A:
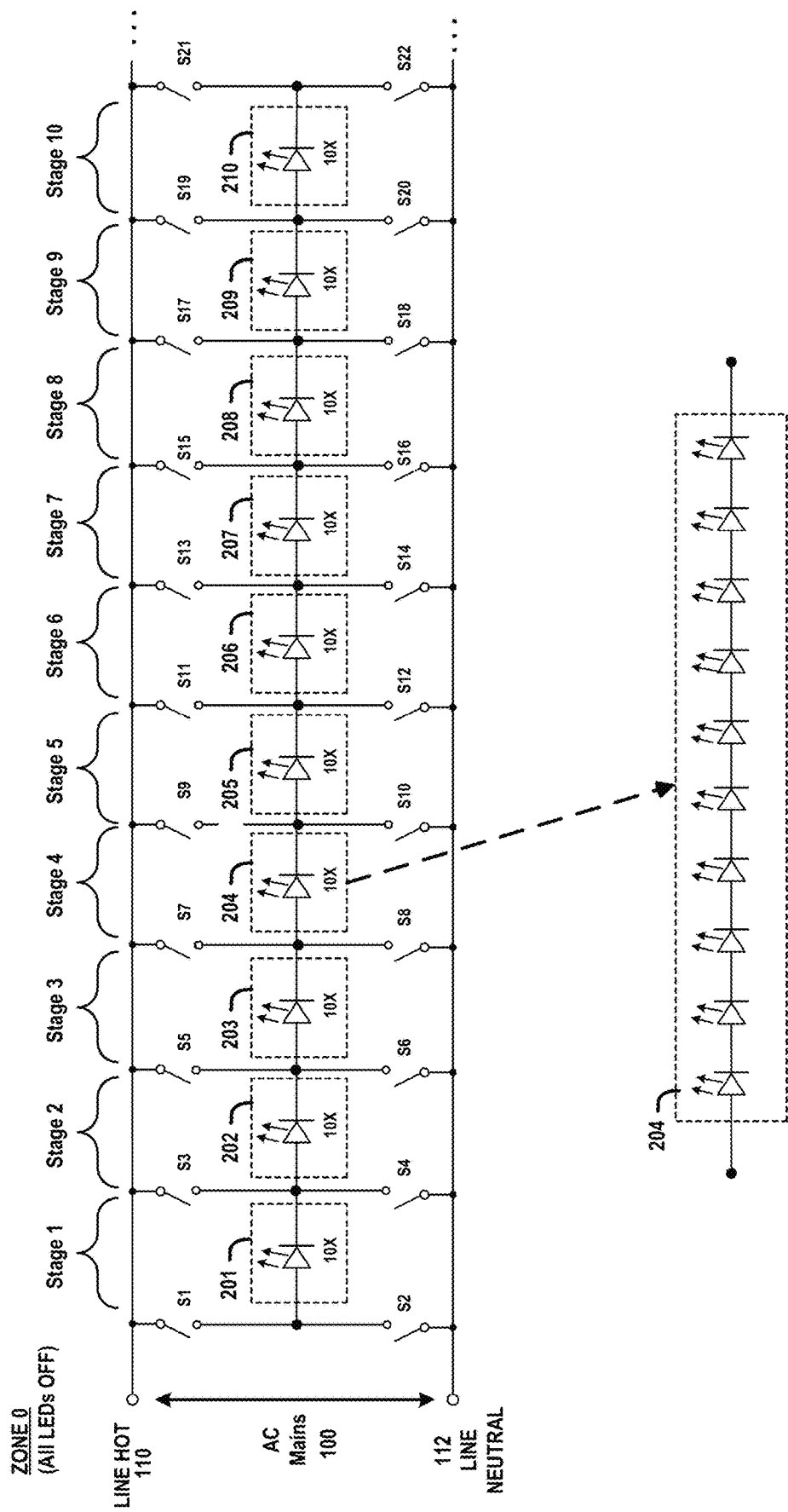

FIG. 2A schematically illustrates an LED circuit 200 comprising a plurality of LED stages, Stage 1-Stage 10, a plurality of switches S1-S22, a first power line 110 (denoted "Line Hot") and a second power line 112 (denoted "Line Neutral"), which are connected to AC power (e.g., the AC waveform 100 of utility supply power of FIG. 1) that is used to drive the LED devices of the LED circuit 200. A shown in FIG. 2A, each LED stage, Stage 1-Stage 10, comprises a respective block of serially-connected LED devices 201-210. For illustrative purposes, only 10 stages are shown in FIG. 2A, although in some embodiments, the LED circuit 200 will have more than 10 stages. In some embodiments, as shown in FIG. 2A, each LED stage, Stage 1-Stage 10, comprises the same number of serially-connected LED devices, e.g., 10 LED devices, as shown in the exploded view of the LED stage, Stage 4, comprising the block 204 of 10 serially-connected LED devices.

The switches, S1-S22, are connected to respective ones of inputs and outputs of the LED stages 201-210, as shown in FIG. 2A. Each LED stage 201-210 comprises (i) an input connected to a first switch and a second switch, wherein the first switch and second switches are configured to selectively connect the input of the LED stage to the first and second power lines 110 and 112, respectively, under control of switch control circuitry, and (ii) an output connected to a third switch and a fourth switch, wherein the third and fourth switches are configured to selectively connect the output of the LED stage to the first and second power lines 110 and 112, respectively. For example, the first block of LEDs 201 in Stage 1 has an input connected to switches S1 and S2, and an output connected to switches S3 and S4. Moreover, the second block of LEDs 202 has an input connected the switches S3 and S4 and to the output of the first block of LEDs 201, and so on.

The configuration of the LED circuit 200 allows the LED devices to be driven directly from the AC power 100 applied to the first and second power lines 110 and 112 by selectively activating the switches S1-S22 according to a switching protocol that is synchronized with the voltage level and phase of the AC power 100. The switching scheme is configured to selectively connect one or more of the blocks of serially-connected LED devices 201-210 to the first and second power lines 110 and 112 to drive the LED stages with the AC power (as opposed to DC power). For example, as explained in further detail below, FIGS. 2B-2K illustrate different switching states of the LED circuit 200 of FIG. 2A, wherein two or more of the blocks of serially-connected LED devices 201-210 are connected in series and/or in parallel between the first and second power lines 110 and 112.

For illustrative purposes, FIGS. 2B-2K will be discussed in the context FIG. 3A, wherein FIG. 3A illustrates an exemplary AC voltage waveform 100 which is applied to the LED circuit 200, and wherein the AC voltage waveform 100 is shown to be divided into a plurality of zones 300 (e.g., Zone 0, Zone 1, Zone 2, Zone 4, and Zone 5) in a positive-half cycle of the AC waveform 100 and a plurality of zones 310 (e.g., Zone 0, Zone 6, Zone 7, Zone 8, Zone 9, and Zone 10) in a negative half-cycle of the AC waveform 100. FIG. 3A illustrates a method for driving the blocks of LED devices 201-210 at various times during the positive and negative half-cycles of the AC voltage waveform 100 to illuminate the LED devices during portions of positive and/or negative cycles of the AC voltage waveform 100, with no periods of darkness except for Zone 0 just before and right after zero voltage crossings of the AC voltage waveform 100 where there is insufficient voltage level to drive any of the blocks of LED devices 201-210.

For example, FIG. 2A illustrates a switching state of the LED circuit 200 in which all the switches S1-S22 are open (i.e., not activated) for Zone 0 of the AC voltage waveform 100 such that all LED stages Stage 1-Stage 10 are deactivated. In particular, in this switching state, none of the blocks of serially-connected LED devices 201-210 are connected to the first and second power lines 110 and 112. As shown in FIG. 3A, Zone 0 represents the portions of the positive and negative half-cycles of the AC voltage waveform 100 in which the voltage is less than 30V. In this instance, it is assumed that 30V is insufficient voltage to properly drive any of the blocks of serially-connected LED devices 201-210, which each include 10 LED devices, which would require at least 35V to activate the given block of 10 LED serially-connected devices each with a nominal forward bias voltage of 3.5V.

FIG. 2B illustrates a switching state of the LED circuit 200 in which the switches S1, S4, S5, S8, S9, S12, S13, S16, S17, and S20 are activated for Zone 1 of the positive half-cycle of the AC voltage waveform 100. In this state, the LED stages Stage 1, Stage 3, Stage 5, Stage 7, and Stage 9 are activated such that the blocks of serially-connected LED devices 201, 203, 205, 207, and 209 are connected in parallel between the first and second power lines 110 and 112. In this state, there is sufficient voltage in Zone 1 of the positive half-cycle of the AC voltage waveform 100 (e.g., greater than 30V) to drive each block of 10 serially-connected LED devices.

FIG. 2C illustrates a switching state of the LED circuit 200 in which the switches S1, S6, S7, S12, S13, and S18 are activated for Zone 2 of the positive half-cycle of the AC voltage waveform 100. In this state, the LED stages Stage 1, Stage 2, Stage 4, Stage 5, Stage 7, and Stage 8 are activated, wherein (i) the blocks of serially-connected LED devices 201 and 202 are concatenated to form a first concatenated block of 20 serially-connected LED devices, (ii) the blocks of serially-connected LED devices 204 and 205 are concatenated to form a second concatenated block of 20 serially-connected LED devices, and (iii) the blocks of serially-connected LED devices 207 and 208 are concatenated to form a third concatenated block of 20 serially-connected LED devices. As further shown in FIG. 2C, the first, second and third concatenated blocks of LED devices are connected in parallel between the first and second power lines 110 and 112. In this state, there is sufficient voltage (greater than 60V) in Zone 2 of the positive half-cycle of the AC voltage waveform 100 to drive each of the first, second and third concatenated blocks of 20 serially-connected LED devices.

FIG. 2D illustrates a switching state of the LED circuit 200 in which the switches S1, S8, S9, and S16 are activated for Zone 3 of the positive half-cycle of the AC voltage waveform 100. In this state, the LED stages Stage 1, Stage 2, Stage 3, Stage 5, Stage 6 and Stage 7 are activated, wherein (i) the blocks of serially-connected LED devices 201, 202, and 203 are concatenated to form a first concatenated block of 30 serially-connected LED devices, and (ii) the blocks of serially-connected LED devices 205, 206 and 207 are concatenated to form a second concatenated block of 30 serially-connected LED devices. As further shown in FIG. 2D, the first and second concatenated blocks of LED devices are connected in parallel between the first and second power lines 110 and 112. In this state, there is sufficient voltage (greater than 90V) in Zone 3 of the positive half-cycle of the AC voltage waveform 100 to drive each of the first and second concatenated blocks of 30 serially-connected LED devices.

FIG. 2E illustrates a switching state of the LED circuit 200 in which the switches S1, S10, S11, and S20 are activated for Zone 4 of the positive half-cycle of the AC voltage waveform 100. In this state, the LED stages Stage 1-Stage 4, and Stage 6-Stage 9 are activated, wherein (i) the blocks of serially-connected LED devices 201, 202, 203, and 204 are concatenated to form a first concatenated block of 40 serially-connected LED devices, and (ii) the blocks of serially-connected LED devices 206, 207, 208, and 209 are concatenated to form a second concatenated block of 40 serially-connected LED devices. As further shown in FIG. 2E, the first and second concatenated blocks of LED devices are connected in parallel between the first and second power lines 110 and 112. In this state, there is sufficient voltage (greater than 120V) in Zone 4 of the positive half-cycle of the AC voltage waveform 100 to drive each of the first and second concatenated blocks of 40 serially-connected LED devices.

FIG. 2F illustrates a switching state of the LED circuit 200 in which the switches S1 and S12 are activated for Zone 5 of the positive half-cycle of the AC voltage waveform 100. In this state, the LED stages Stage 1-Stage 5 are activated, wherein the blocks of serially-connected LED devices 201, 202, 203, 204, and 205 are concatenated to form a first concatenated block of 50 serially-connected LED devices, which is connected between the first and second power lines 110 and 112. In this state, there is sufficient voltage (greater than 150V) in Zone 5 of the positive half-cycle of the AC voltage waveform 100 to drive the first concatenated block of 50 serially-connected LED devices.

As shown in FIG. 3A, on the falling portion of the positive-half cycle, the Zone sequence Z4, Z3, Z3, Z1 and Z0 results in a repeated reverse sequence of the switching states shown in FIGS. 2A-2E. As further shown in FIG. 3A, for the negative half-cycle of the AC voltage waveform 100, the waveform transitions in a Zone sequence of Zone 0, Zone 6, Zone 7, Zone 8, Zone 9, Zone 10, Zone 9, Zone 8, Zone 7, Zone 6 and Zone 0. FIGS. 2G through 2K illustrate different switching states of the LED circuit 200 in sequence from Zone 6 through Zone 10. FIGS. 2G-2K illustrate LED stage activation configurations similar to those shown in FIGS. 2B-2F, but wherein the inputs to the LED stages are connected to the second power line 112 in the negative half-cycle of the AC voltage waveform 100 to place the LED devices in a forward-biased state.

In particular, FIG. 2G illustrates a switching state of the LED circuit 200 in which the switches S2, S3, S6, S7, S10, S11, S14, S15, S18 and S19 are activated for Zone 6 of the negative half-cycle of the AC voltage waveform 100. In this state, the LED stages Stage 1, Stage 3, Stage 5, Stage 7, and Stage 9 are activated such that the blocks of serially-connected LED devices 201, 203, 205, 207, and 209 are connected in parallel between the first and second power lines 110 and 112. In this state, there is sufficient voltage in Zone 6 of the AC voltage waveform (e.g., greater than 30V) to drive each block of 10 serially-connected LED devices. In this configuration, as shown in FIG. 2G, the input terminals of the blocks of serially-connected LED devices 201, 203, 205, 207, and 209 are connected to the second power line 112 and the output terminals of the blocks of serially-connected LED devices 201, 203, 205, 207, and 209 are connected to the first power line 110, which places the LED devices in a forward-biased state during the negative half-cycle of the AC voltage waveform 100.

Figure 2H:
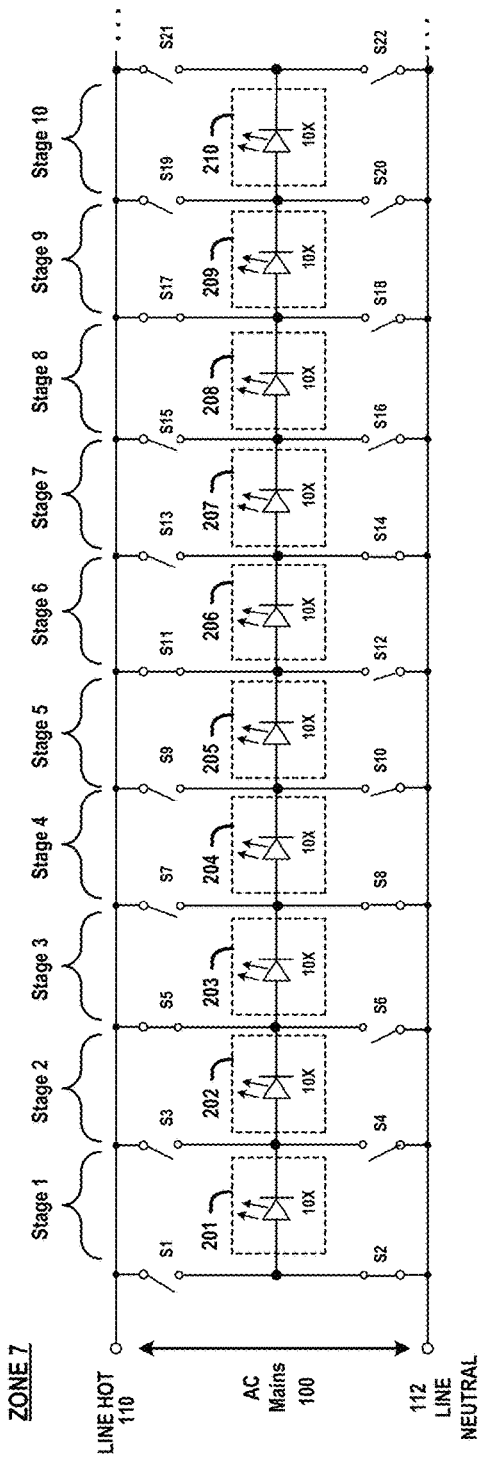

FIG. 2H illustrates a switching state of the LED circuit 200 in which the switches S2, S5, S8, S11, S14, and S17 are activated for Zone 7 of the negative half-cycle of the AC voltage waveform 100. In this state, the LED stages Stage 1, Stage 2, Stage 4, Stage 5, Stage 7 and Stage 8 are activated, wherein (i) the blocks of serially-connected LED devices 201 and 202 are concatenated to form a first concatenated block of 20 serially-connected LED devices, (ii) the blocks of serially-connected LED devices 204 and 205 are concatenated to form a second concatenated block of 20 serially-connected LED devices, and (iii) the blocks of serially-connected LED devices 207 and 208 are concatenated to form a third concatenated block of 20 serially-connected LED devices. As further shown in FIG. 2H, the first, second and third concatenated blocks of LED devices are connected in parallel between the first and second power lines 110 and 112. In this state, there is sufficient voltage (greater than 60V) in Zone 7 of the negative half-cycle of the AC voltage waveform 100 to drive each of the first, second, and third concatenated blocks of 20 serially-connected LED devices.

Figure 2I:
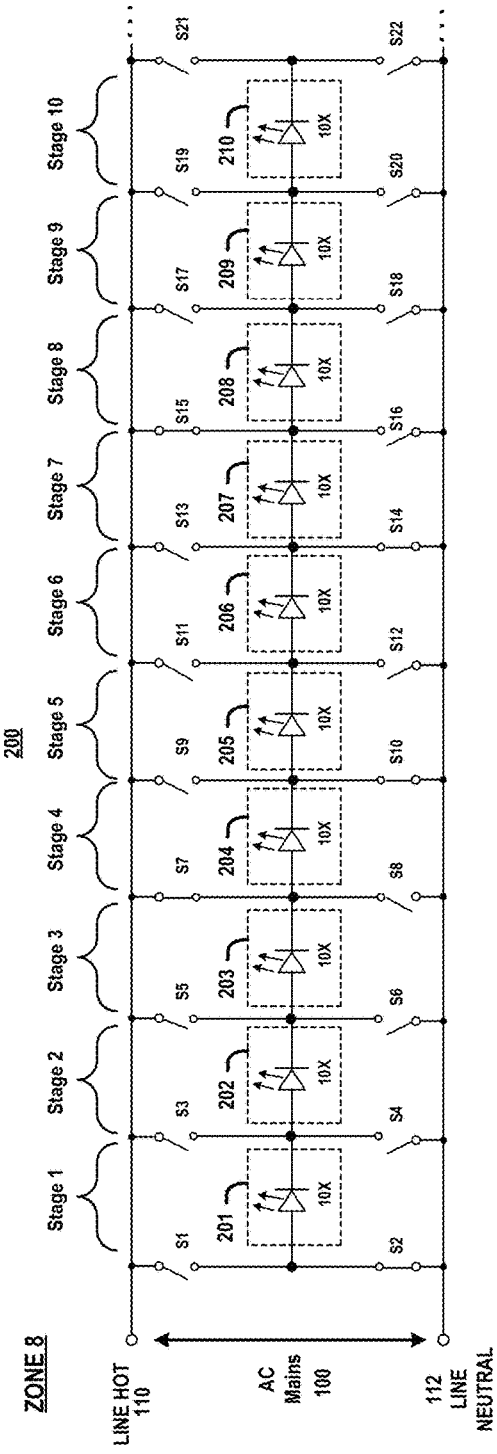

FIG. 2I illustrates a switching state of the LED circuit 200 in which the switches S2, S7, S10, and S15 are activated for Zone 8 of the negative half-cycle of the AC voltage waveform 100. In this state, the LED stages Stage 1, Stage 2, Stage 3, Stage 5, Stage 6 and Stage 7 are activated, wherein (i) the blocks of serially-connected LED devices 201, 202, and 203 are concatenated to form a first concatenated block of 30 serially-connected LED devices, and (ii) the blocks of serially-connected LED devices 205, 206, and 207 are concatenated to form a second concatenated block of 30 serially-connected LED devices. As further shown in FIG. 2I, the first and second concatenated blocks of LED devices are connected in parallel between the first and second power lines 110 and 112. In this state, there is sufficient voltage (greater than 90V) in Zone 8 of the negative half-cycle of the AC voltage waveform 100 to drive each of the first and second concatenated blocks of 30 serially-connected LED devices.

Figure 2J:
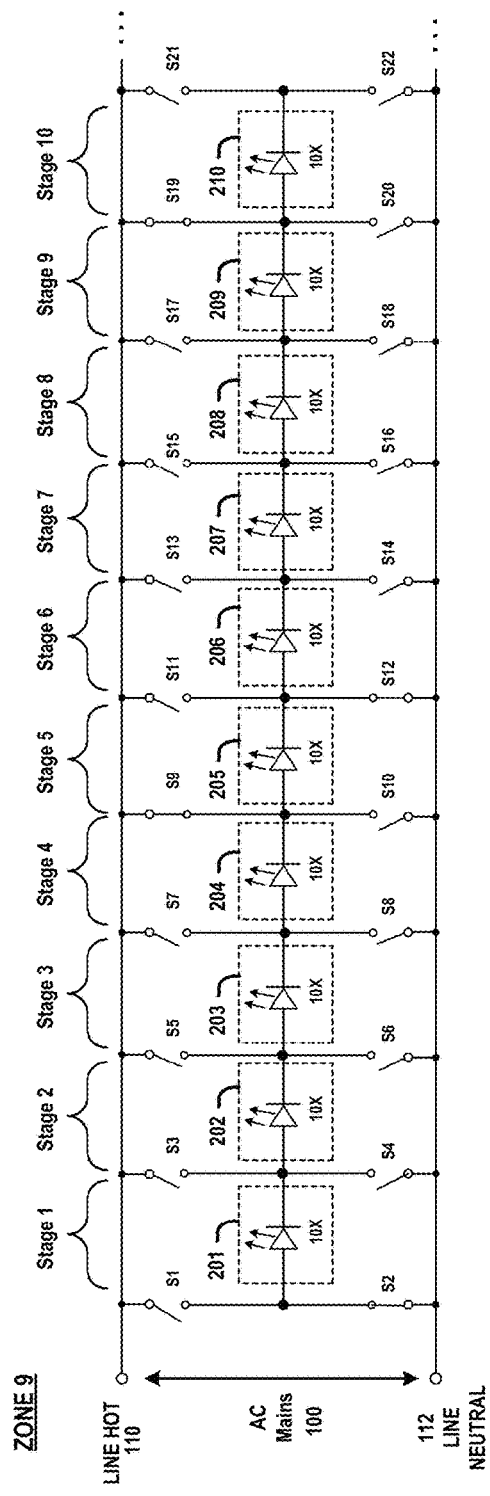

FIG. 2J illustrates a switching state of the LED circuit 200 in which the switches S2, S9, S12, and S19 are activated for Zone 9 of the negative half-cycle of the AC voltage waveform 100. In this state, the LED stages Stage 1-Stage 4, and Stage 6-Stage 9 are activated, wherein (i) the blocks of serially-connected LED devices 201, 202, 203, and 204 are concatenated to form a first concatenated block of 40 serially-connected LED devices, and (ii) the blocks of serially-connected LED devices 206, 207, 208, and 209 are concatenated to form a second concatenated block of 40 serially-connected LED devices. As further shown in FIG. 2J, the first and second concatenated blocks of LED devices are connected in parallel between the first and second power lines 110 and 112. In this state, there is sufficient voltage (greater than 120V) in Zone 9 of the negative half-cycle of the AC voltage waveform 100 to drive each of the first and second concatenated blocks of 40 serially-connected LED devices.

Figure 2K:
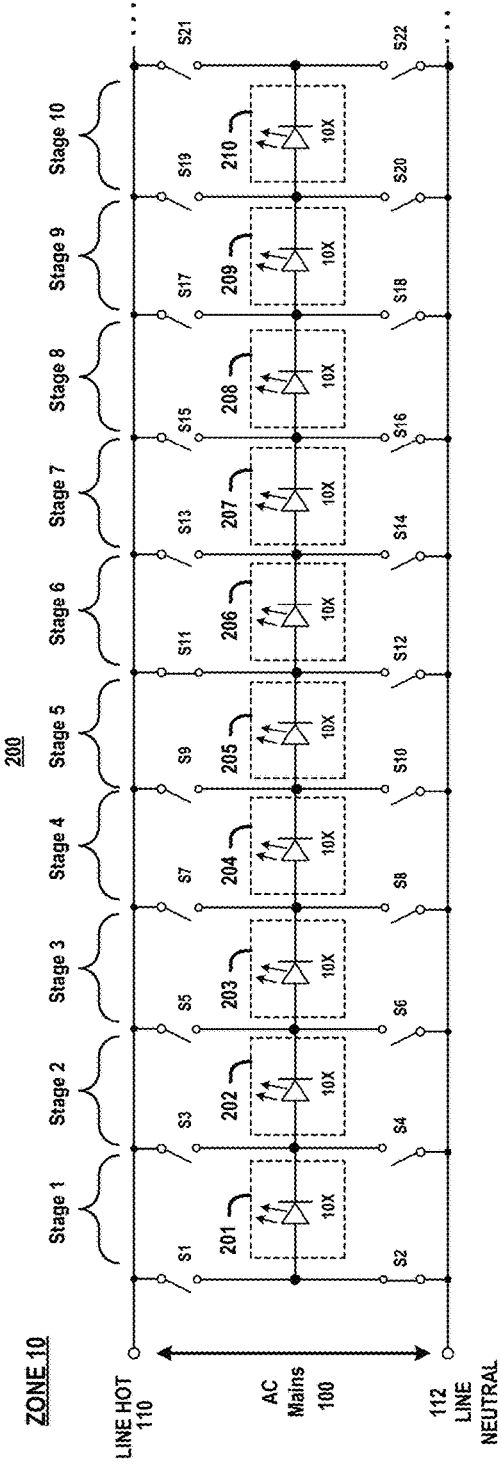

FIG. 2K illustrates a switching state of the LED circuit 200 in which the switches S2 and S11 are activated for Zone 10 of the negative half-cycle of the AC voltage waveform 100. In this state, the LED stages Stage 1-Stage 5 are activated, wherein the blocks of serially-connected LED devices 201, 202, 203, 204, and 205 are concatenated to form a first concatenated block of 50 serially-connected LED devices, which is connected between the first and second power lines 110 and 112. In this state, there is sufficient voltage (greater than 150V) in Zone 10 of the negative half-cycle of the AC voltage waveform 100 to drive the first concatenated block of 50 serially-connected LED devices.

Referring again to FIG. 3A, on the rising portion of the negative-half cycle of the AC voltage waveform 100, the Zone sequence Z9, Z8, Z7, Z6 and Z0 results in a repeated reverse sequence of the switching states shown in FIGS. 2G-2J. As demonstrated above, FIGS. 2A-2K and FIG. 3A collectively illustrate an exemplary embodiment of the disclosure in which LED blocks of 10 serially-connected LED devices, which comprise LED devices with an operating range of about 2.8V to 4.2V, can support a working range of about 30V to about 40 V, and even higher voltages by concatenating the LED blocks, thereby allowing a relatively stable level of light to be generated by the LED devices for a majority of the positive and negative cycles of the AC mains power. The timing for activating the various switches S1-S22 as shown in FIGS. 2A-2K may be implemented based on, e.g., detection of voltage level, phase, and/or time, e.g., based on line frequency and/or detection of zero-crossing events using one or more zero-crossing detector circuits, or other schemes as discussed in further detail below.

FIG. 3B schematically illustrates a current waveform 320 to show that positive current flows through the blocks of serially-connected LED devices 201-210 of the activated LED stages of the LED circuit 200 in FIGS. 2B-2K during both the positive and negative half-cycles of the AC voltage waveform 100. In this regard, the LED circuit 200 and associated switch fabric and switching configurations as discussed above enables a virtual rectification of the negative half-cycles of the AC voltage waveform 100 as a result of connecting the positive terminals of the blocks of serially-connected LED devices 201-210 to the second power line 112 (e.g., line neutral) during the negative half-cycle of the AC voltage waveform 100. As explained below in conjunction with FIG. 6, in some embodiments, each switch S1-S22 is implemented as a bidirectional solid-state switch which can be controlled in bi-directional fashion with unidirectional current flow, such that the negative half-cycles of the AC mains waveform 100 have substantially the same illumination capability as positive half-cycles of the AC mains waveform 100.

In some embodiments of the disclosure, with non-limiting reference to the exemplary embodiment of FIGS. 2A-2K, the switching sequence and activation of the LED stages for each of the Zones 1-10 is configured to provide a relatively constant illumination level over the various Zones 1-5 and 6-10 of the positive and negative half-cycles of the AC voltage waveform 100. For example, FIG. 3C schematically illustrates an exemplary process to achieve a constant brightness by activating a number N of LEDs in each zone in a manner that is inversely proportional to the magnitude of the current. In particular, FIG. 3C illustrates the current waveform 320 (of FIG. 3B) superimposed with a first curve 330 and a second curve 340.

The first curve 330 represents a number of LEDs (N) as function of 1/sin(wt) (based on the frequency, e.g., 60 Hz of the AC voltage waveform 100). The second curve 340 represents an empirically determined brightness L, which is empirically determined as L=1/N×k, wherein I denotes a magnitude of the current waveform 320, N denotes a number of LEDs to be activated, and k denotes an empirically determined constant. The first and second curves 330 and 340 represent functions that are utilized by a processor to control the switching in the LED circuitry to activate a given number N of LEDs for a given zone based on the magnitude of the current I. In this control process, as the AC power transitions through the Zones 300 and 310 in the positive and negative half-cycles, as the current I increases, the number N of LEDs activated will decrease, and vice versa.

As schematically illustrated in FIG. 3C, the desired brightness waveform 340 provides a constant DC brightness level L over all Zones 1-10, while providing a short dark period for each Zone 0 in the positive and negative half-cycles of the AC power. However, since the darkness period where L=0 is very short (e.g., less than 10% of full AC waveform cycle), any flickering due to such short period of darkness will not be visible to the human eye.

In an exemplary non-limiting embodiment, the various switching states of the LED circuit 200 shown in FIGS. 2B-2K can implement a switching function in accordance with the principles of FIG. 3C to achieve relatively constant brightness by the LEDs activated in each of the Zones 1-10. For example, in FIG. 2B, for Zone 1 where the voltage reaches 30V, 15 stages of the 10 serially-connected LED blocks can be activated in parallel to turn on 150 LEDs. In FIG. 2C, for Zone 2 where the voltage increases to about 60V, the total number N of activated LEDs will be about 100. In FIG. 2D, for Zone 3 where the voltage increases to about 90, the total number N of activated LEDS will be about 90. In FIG. 2E, for Zone 4 where the voltage increases to about 120V, the total number N of activated LEDs will be about 80. In FIG. 2F, for Zone 5 where the voltage increases to about 150V, the total number N of activated LEDs will be about 50. The same number of LEDs for each of Zones 6-10 will be the same for Zones 1-5. In this manner, as the voltage increases in the sequential Zones (and thus the current I increases, FIG. 3B), the number N of activated LEDs will be decreased to maintain a constant brightness level across the Zones, while as the voltage decreases in sequential Zones, the number N of activated LEDs will be increased to maintain a constant brightness level across the Zones.

Figure 4:
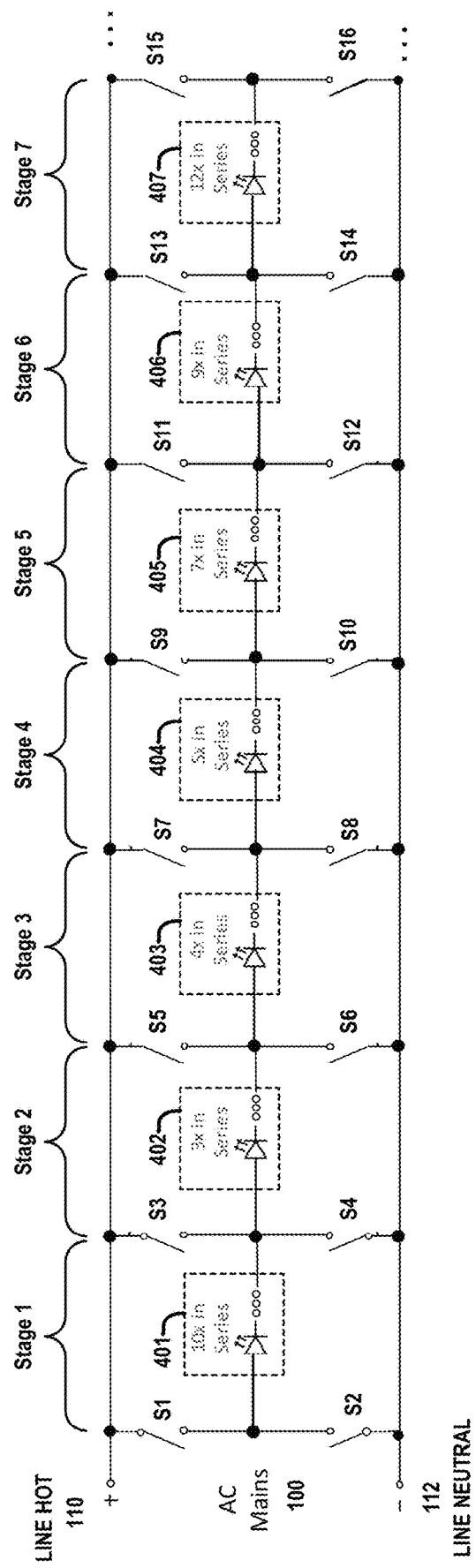
FIG. 4 schematically illustrates an LED circuit according to an exemplary embodiment of the disclosure.

FIG. 4 schematically illustrates an LED circuit 400 according to another embodiment of the disclosure. The LED circuit 400 comprises a plurality of LED stages, Stage 1-Stage 7, a plurality of switches S1-S16, a first power line 110 (denoted "Line Hot") and a second power line 112 (denoted "Line Neutral"), which are connected to AC power (e.g., the AC waveform 100 of utility supply power of FIG. 1) that is used to drive the LEDs stages of the LED circuit 400. As shown in FIG. 4, each LED stage comprises a respective block of serially-connected LED devices 401-207. For illustrative purposes, only 7 stages are shown in FIG. 4, although in some embodiments, the LED circuit 400 will have more than 7 LED stages.

In the exemplary embodiment of FIG. 4, the blocks of serially-connected LED devices 401-407 have different numbers of serially-connected LED devices. For example, in the first LED stage (Stage 1), the block of serially-connected LED device 401 comprises 10 LED devices. In the second LED stage (Stage 2), the block of serially-connected LED devices 402 comprises 3 LED devices. In the third LED stage (Stage 3), the block of serially-connected LED devices 403 comprises 4 LED devices. In the fourth LED stage (Stage 4), the block of serially-connected LED devices 404 comprises 5 LED devices. In the fifth LED stage (Stage 5), the block of serially-connected LED devices 405 comprises 7 LED devices. In the sixth LED stage (Stage 6), the block of serially-connected LED devices 406 comprises 9 LED devices. In the seventh LED stage (Stage 7), the block of serially-connected LED devices 407 comprises 12 LED devices. In this configuration, the varied number of LED devices in each LED stage allows for a more fine-adjustment of the number of LED devices that are activated or deactivated during different Zones of the AC power cycles based on smaller increases or decreases in voltage over a large number of Zones.

Figure 5A:
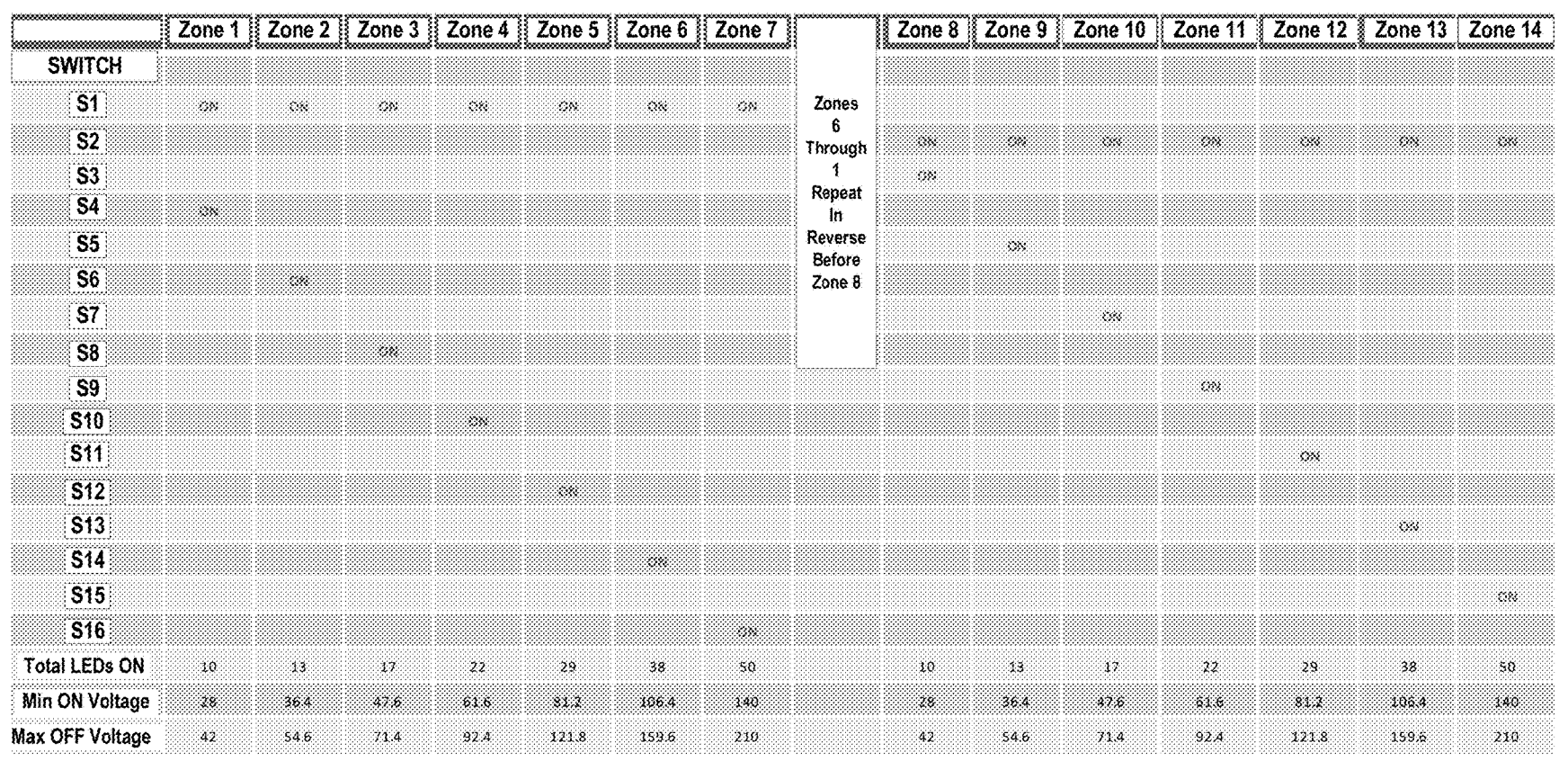

For example, FIG. 5A is a table that illustrates various switching states of the switches S1-S16 in the LED circuit 400 of FIG. 4 over fourteen different and overlapping Zones.

In FIG. 5A, is assumed that the LED devices of FIG. 4 have a 3.5V nominal operating voltages, and the AC voltage waveform 100 comprises a 120 Vrms waveform. As shown in FIG. 5A, the number of activated LED devices for Zones 1 through 7 and Zones 8 through 14 are shown as: 10, 13, 17, 22, 29, 38, and 50 LED devices, respectively, wherein the Zones are configured to overlap an eliminate potential short periods of darkness between Zones. In this configuration, the LED circuit 400 can have an LED stage that is activated at 9V, rather than 30V (for the 10 LED stages shown in FIGS. 2A-2K). In particular, in the exemplary embodiment of FIG. 4, the following LED stages can be activated with the following voltage levels: (i) the 3-LED stage 402 can be enabled with the AC mains between 9 to 12 Volts; (ii) the 4-LED stage 403 can be enabled with the AC mains between 12V to 15V; (iii) the 5-LED stage 404 can be enabled with the AC mains between 15 to 20V; (iv) the 7-LED stage 405 can be enabled with the AC mains between 21V to 27V (or higher); (v) the 9-LED stage 406 zone can be enabled with the AC mains between 27V to 30 V (or higher); and (vi) the 10-LED stage can be enabled with the AC mains at around 35V (or higher), etc.

FIG. 5B shows one full cycle of an AC voltage waveform 100 with overlapping Zones 1-7 in the positive half-cycle 500 of the AC voltage waveform 100, and overlapping zones 8-14 in the negative half-cycle 510 of the AC voltage waveform 100. FIG. 5B illustrates an exemplary embodiment for providing time overlap for switching states in the various Zones, to thereby eliminate potential short periods of darkness between adjacent Zones.

Figure 6:
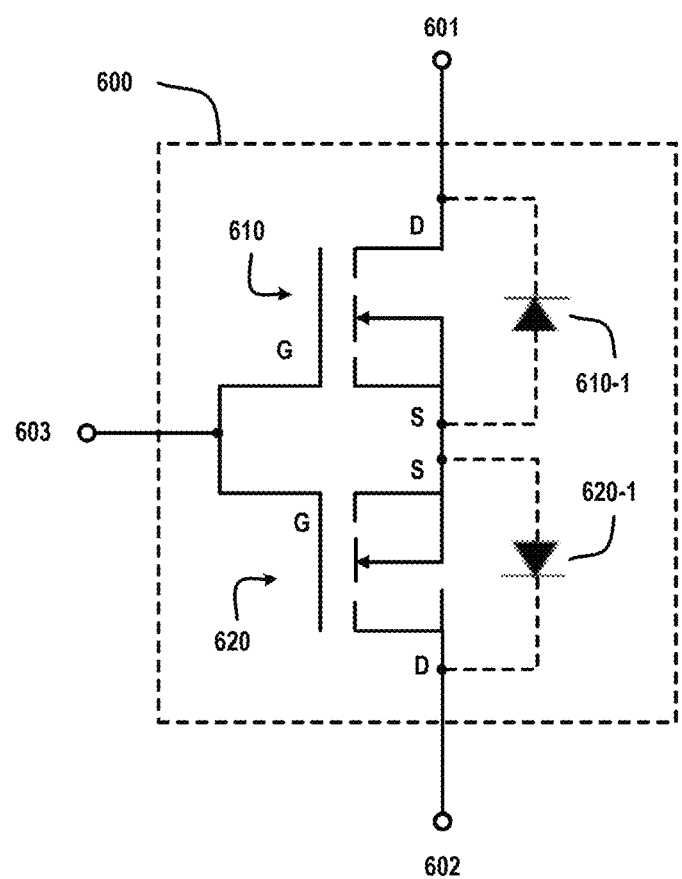
FIG. 6 schematically illustrates a solid-state bidirectional switch which can be used to implement the switches shown in the LED circuits of FIGS. 2A and 4, according to an exemplary embodiment of the disclosure.

FIG. 6 schematically illustrates a solid-state bidirectional switch 600 which can be used to implement the switches shown in the LED circuits 200 and 400 of FIGS. 2A and 4. The solid-state bidirectional switch 600 comprises first and second input/output terminals 601 and 602, and a control terminal 603. The solid-state bidirectional switch 600 is configured to allow a bidirectional flow of current, when the solid-state bidirectional switch 600 is in "switched-on state" by operation of a control signal applied to the control terminal 603.

The solid-state bidirectional switch 600 comprises a first MOSFET switch 610 and a second MOSFET switch 620 which are connected back-to-back in series. In some embodiments, the first and second MOSFET switches 610 and 620 comprise power MOSFET devices and, in particular, N-type enhancement MOSFET devices, having gate terminal (G), drain terminals (D), and source terminals (S) as shown. In the exemplary embodiment of FIG. 6, the solid-state bidirectional switch 600 is implemented using two N-channel MOSFET switches 610 and 620 with commonly connected source terminals. The first and second MOSFET switches 610 and 620 comprises intrinsic body diodes 610-1 and 620-1, respectively, which represent the P-N junctions between the P-type substrate body to N-doped drain regions of the MOSFET devices. The body diodes 610-1 and 620-1 are intrinsic elements of the MOSFET switches 610 and 620 (i.e., not discrete elements) and, thus, are shown with dashed-line connections. It is to be noted that the intrinsic body-to-source diodes of the MOSFET switches 610 and 620 are not shown as they are shorted out by the connections between the source regions and the substrate bodies (e.g., N+ source and P body junction are shorted through source metallization). The operation of the solid-state bidirectional switch 600 is well known to those of ordinary skill in the art.

Figure 7:
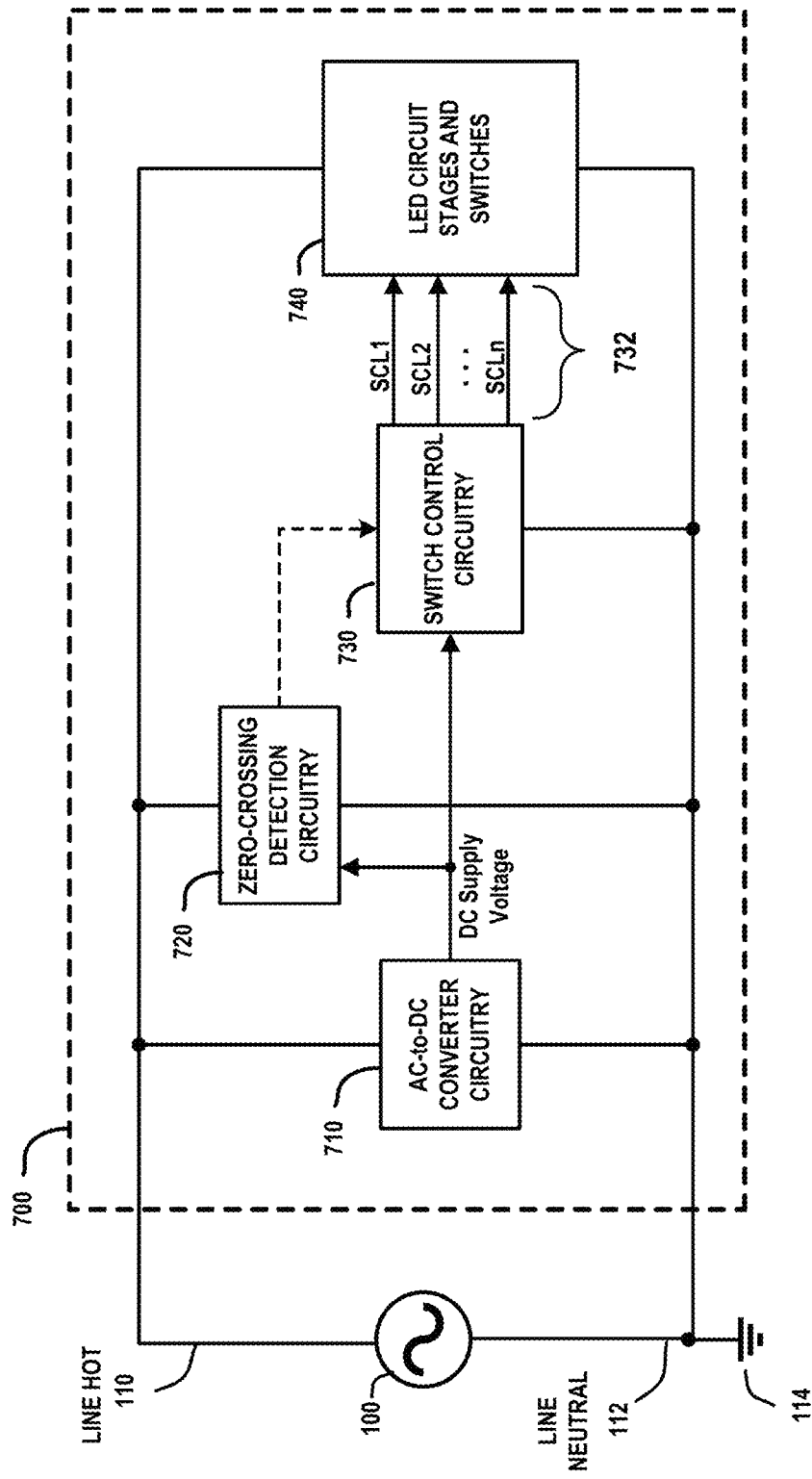
FIG. 7 schematically illustrates a light generating circuit according to an exemplary embodiment of the disclosure.

FIG. 7 schematically illustrates a light generating circuit 700 according to an exemplary embodiment of the disclosure. The light generating circuit 700 is connected to a utility AC power supply 100 which is utilized by the light generating circuit 700 to drive LED devices using techniques as discussed herein. The light generating circuit 700 is connected to a hot phase 110 (referred to as "line hot") of the AC mains 100 and a neutral phase 112 (referred to as "line neutral") of the AC mains 100. As further illustrated in FIG. 7, the line neutral 112 is shown bonded to earth ground 114 (GND), which provides added protections as is known in the art.

The light generating circuit 700 comprises AC-to-DC converter circuitry 710, zero-crossing detection circuitry 720, switch control circuitry 730, and an arrangement of LED circuit stages and switches 740. In some embodiments, the arrangement of LED circuit stages and switches 740 implements an LED circuit which is the same or similar to the LED circuits 200 or 400 as shown in FIGS. 2A and 4. The switch control circuitry 730 implements switching protocols to selectively activate switches within the block of LED circuit stages and switches 740 to selectively connect individual and/or concatenated blocks of serially-connected LED devices to the AC power supply lines, to drive the LED switches using AC power. The switch control circuitry 730 generates and outputs switch control signals on a plurality (n) of switch control lines SCL1, SCL2, SCLn, which are connected to control terminals of corresponding switches within the switching fabric that is utilized to selectively connect individual and/or concatenated blocks of serially-connected LED devices within the LED stages 740 to the AC power supply lines.

The AC-to-DC converter circuitry 710 is configured to provide DC supply power to various circuitry and elements of the light generating circuit 700 including the zero-crossing detection circuitry 720 and the switch control circuitry 730. However, the AC-to-DC converter circuitry 710 is not configured to provide DC supply voltage for driving LED devices. In some embodiments, the AC-to-DC converter circuitry 710 can be implemented using the same or similar DC power conversion techniques as disclosed in the following co-pending applications: (1) U.S. patent application Ser. No. 16/092,263, filed on Oct. 9, 2018 (Pub. No.: US 2019/0165691), entitled High-Efficiency AC to DC Converter and Methods; and (2) U.S. patent application Ser. No. 16/340,672, filed on Apr. 9, 2019 (Pub. No.: US 2019/0238060), entitled High-Efficiency AC Direct to DC Extraction Converter and Methods, the disclosures of which are all fully incorporated herein by reference.

The zero-crossing detection circuitry 720 is configured to detect zero voltage crossings of the AC voltage waveform that drives the LEDs. The zero-crossing detection circuitry 720 can be implemented using any suitable type of voltage zero-crossing detection circuitry that is configured to sense zero crossings of voltage of the AC power supply waveform and generate a detection signal which indicates a zero-crossing event and an associated transition direction of the zero-crossing event of the voltage waveform (e.g., the AC waveform transitioning from negative to positive (referred to as "positive transition direction"), or the AC waveform transitioning from positive to negative (referred to as a "negative transition direction")). In some embodiments, the zero-crossing detection circuitry 720 is compare the AC voltage on the hot line to a zero reference voltage (e.g., line neutral voltage) to determine the polarity of the AC waveform on the hot line path, and detect a zero-crossing event and the associated transition direction of the zero-crossing of the AC waveform. In some embodiments, the comparing is performed using a voltage comparator which has a non-inverting input connected to the hot line path, and an inverting input that receives a reference voltage. The output of the voltage comparator switches (i) from logic 1 to logic 0 when the input voltage transitions from positive to negative and (ii) from logic 0 to logic 1 when the input voltage transitions from negative to positive. In this instance, the output of the zero-crossing detection circuitry 720 will transition between a logic "1" and logic "0" output upon each detected zero crossing of the AC voltage waveform. The switch control circuitry 730 utilizes the timing and polarity transition direction of the detected zero voltage crossings to control the timing and sequence of activating the switches with the block of LED circuit stages and switches and connect the LED devices to the AC supply lines to drive the LED stages, as discussed above.

The switch control circuitry 730 may comprise a central processing unit, a microprocessor, a microcontroller, an application-specific integrated circuit (ASIC), a field programmable gate array (FPGA), and other types of processors, as well as portions or combinations of such processors, which can perform switch control functions using hardware control, software/firmware control, and a combination thereof.

In other embodiments, the switch control circuitry 730 may implement modulation schemes, such as pulse-width modulation (PWM), to modulate the activation of the LED stages in the different zones to implement flicker-free levels of dimming with complete compatibility with the AC-Direct LED driving methods as discussed herein. The modulation can be configured to soften the transition between states when strings of LED devices are added or removed. Also, the implementation of a computing device, such as CPU core, microcontroller, or other digital/analog device, can facilitate support for overall or local system reconfiguration, e.g., during manufacturing and/or operational use in the field to mitigate AC main transient events.

It is to be understood that the various combinations of LED strings, the number of LEDs, whether in series or parallel, and/or with varying switching configurations and LED operating voltages may be a linear and/or non-linear optimization problem that can be determined based on various design and/or cost constraints.

The switch control methods that are implemented by, e.g., the switch control circuitry 730 may be synchronized in time with the AC voltage waveform to divide the AC waveform into discrete Zones, as discussed above. The switch control process may be synchronized with line frequency, with the incremented states beginning from zero voltage switching and zero crossing events as detected by the zero-crossing detection circuitry 720. The LED switching Zones can be determined form initial power-up 0 time/0Vs, optionally divided into multiple zones (e.g., 5 Zones) equally with equal time duration with slide variation.

In some embodiments, each switching zone may be pulse width modulated (or other modulation technique) to provide illumination balance at each zone, during zone overlap, and for dimming control. Also, by steering to control current automatically under algorithmic control, additional LEDs may be added in parallel to increase light output per zone, and number of zones may be adjustable by design and/or configured initially in factory or field subsequently.

In other embodiments, state changes may be timed using, e.g., resistor-capacitor time constant within each zone among the LEDs. Furthermore, to maintain a constant illumination level during rising and falling portions of the AC mains waveform, each subsequent zone (i.e., after initial zone) may be controlled via a PWM scheme that enables a prior-to-previous zone disable operation, whereby the PWM starts with an increasing duty cycle on the rising portion of the AC mains waveform until a previous zone disables, and gradually decreases while the AC mains waveform continues to rise. Accordingly, the PWM gradually increases in duty cycle during a downward slope of AC mains waveform to maintain the intensity with a decreasing voltage level; hence, being possible for PWM at subsequent zones implemented with an intermediate connection to ground.

Figure 8:
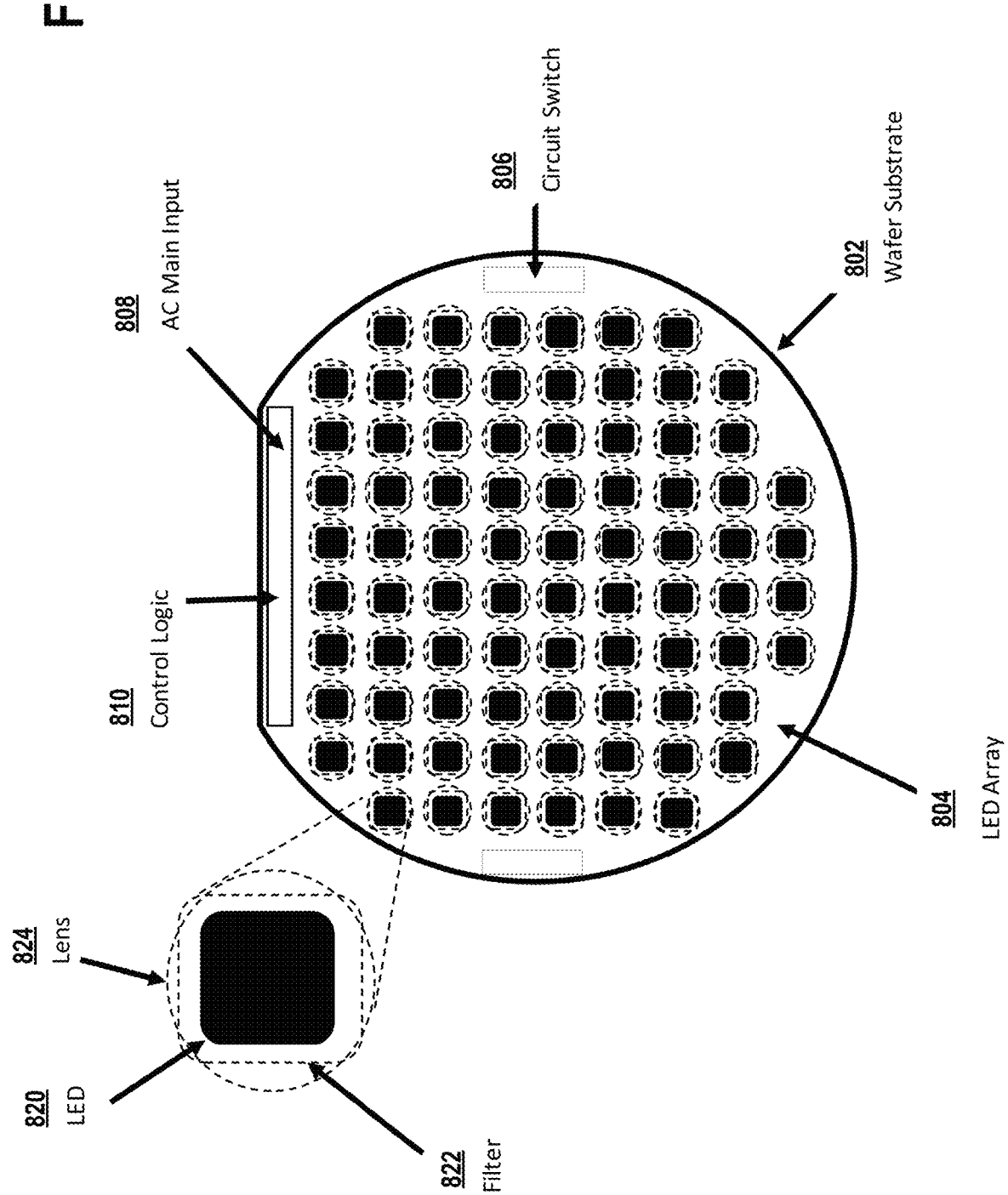
FIG. 8 schematically illustrates a light generating device which is implemented in a monolithic wafer form, according to an exemplary embodiment of disclosure.

FIG. 8 schematically illustrates a light generating device 800 which is implemented in a monolithic wafer form, according to an exemplary embodiment of disclosure. The light generating device 800 comprises a semiconductor wafer substrate 802 (e.g., silicon substrate), which comprises a monolithic integrated circuit. The monolithic integrated circuit comprises an LED array 804, switch circuitry 806, AC power input terminals 808, and control circuitry 810. In some embodiments, FIG. 8 illustrates a monolithic wafer implementation of the light generating circuit 700 of FIG. 7.

The AC power input terminals 808 are configured for connection to an AC power source. The AC power input terminals 808 are coupled to first and second power lines that comprise metallization that is used to route and distribute the AC power to various regions of the wafer 802. The LED array 804 comprises a plurality of LED devices 820 that are connected to form a plurality of LED stages, wherein each LED stage comprises a plurality of serially-connected LED devices 820, such as schematically illustrated in FIGS. 2A and 4, for example. The switching circuitry 806 comprises a plurality of switches (e.g., solid-state bi-directional switches) that are coupled to the LED array 804 using a wiring network to connect the switches to the inputs and outputs of the LED stages. The switch control circuitry 810 is configured to control the plurality of switches of the switching circuitry 806 to selectively connect at LED stages to the first and second power lines to empower the LED stages with AC power from the AC power source connected to the AC input terminals 808. The switches within the switching circuitry 806 can be configured in a microcell arrangement, or a functional cell arrangement with well-defined tab positions.

As further shown in FIG. 8, in some embodiments, each LED device 820 comprises an optical filter 822 disposed over the LED device 820 and a lens element 824 disposed over the LED device 820. In some embodiments, the optical filter 822 comprise a phosphor layer to filter the light that is emitted by the LED device 820. The lens element 824 is configured to direct, focus, collimate, etc., or otherwise achieve a desired directionality of the light that is emitted by the LED device 820.

FIG. 8 illustrates an exemplary embodiment wherein the light generating device 800 implemented in monolithic wafer form can be used to implement an LED lighting device or system without requiring wafer segmentation for repackaging in different form factors. The wafer substrate 802 can be implemented using various standard wafer sizes to accommodate larger or smaller LED arrays to achieve a desired light output level. Larger wafers can be partitioned into smaller dies, wherein each die comprises an integrated light generating monolithic circuit.

Figure 9:
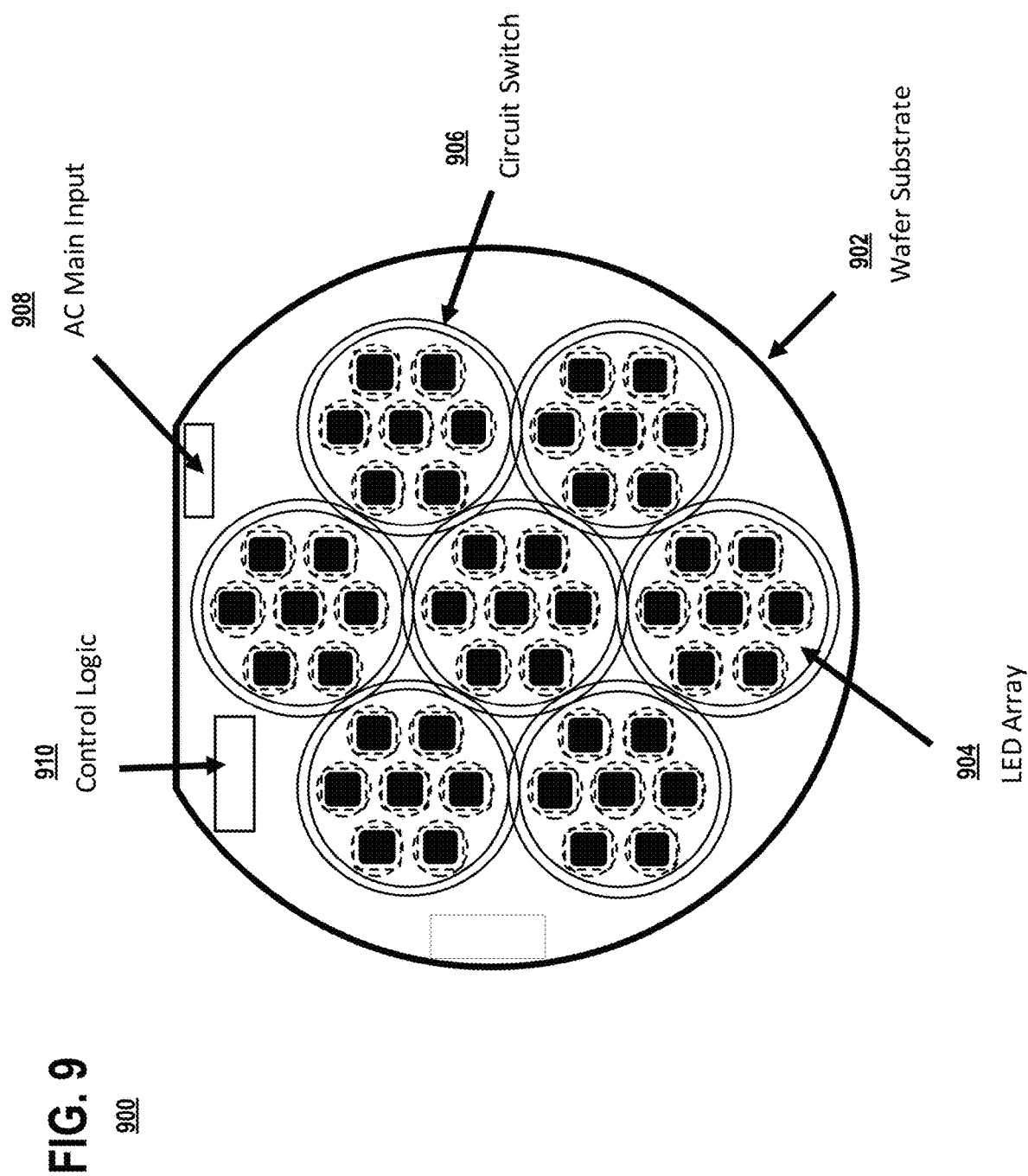
FIG. 9 schematically illustrates a light generating device which is implemented in a monolithic wafer form, according to another exemplary embodiment of disclosure.

FIG. 9 schematically illustrates a light generating device 900 which is implemented in a monolithic wafer form, according to another exemplary embodiment of disclosure. The light generating device 900 comprises a semiconductor wafer substrate 902 (e.g., silicon substrate), which comprises a monolithic integrated circuit. The monolithic integrated circuit comprises an LED array 904, switch circuitry 906, AC power input terminals 908, and control circuitry 910. In some embodiments, FIG. 9 illustrates a monolithic wafer implementation of the light generating circuit 700 of FIG. 7. The light generating device 900 is similar to the light generating device 800 of FIG. 8, except that the light generating device 900 has a different arrangement of LED devices within the LED array 904, wherein the LED array 904 comprises LED devices arranged in circular footprint regions, wherein each circular footprint region is surrounded by switch circuitry 906 which comprises an arrangement of switches that are utilized to connect the LED devices, or blocks of serially-connected LED devices, to power lines or otherwise concatenate blocks of serially-connected LED devices to form larger strings of serially-connected LED device, such as discussed above.

Although exemplary embodiments have been described herein with reference to the accompanying figures, it is to be understood that the current disclosure is not limited to those precise embodiments, and that various other changes and modifications may be made therein by one skilled in the art without departing from the scope of the appended claims.

What is claimed is:

1. An integrated circuit comprising:
 a first power line and a second power line configured for connection to an alternating-current (AC) power source;
 a plurality of light-emitting diode (LED) stages, wherein each LED stage comprises a plurality of LED devices that are serially connected between an input terminal and an output terminal of the LED stage, and wherein the LED stages are coupled in a chain with the input terminal of at least one LED stage coupled to the output terminal of another LED stage;
 switching circuitry coupled to the first and second power lines and to the input and output terminals of each LED stage; and
 switch control circuitry configured to control the switching circuitry to (i) selectively connect the first power line and the second power line to the input terminal and the output terminal, respectively, of at least one LED stage during a positive half-cycle of AC power applied to the first and second power lines, and (ii) selectively connect the second power line and the first power line to the input terminal and the output terminal, respectively, of the at least one LED stage during a negative half-cycle of the AC power applied to the first and second power lines.

2. The integrated circuit of claim 1, wherein the switch control circuitry is configured to execute a switch timing control program to synchronize operation of the switching circuitry to empower one or more LED stages based on a voltage level of the applied AC power.

3. The integrated circuit of claim 1, wherein:
 the plurality of LED stages comprises a first LED stage and a second LED stage, wherein the input terminal of the second LED stage is coupled to the output terminal of the first LED stage; and
 the switch control circuitry is configured to control the switching circuitry to (i) selectively connect the first power line to the input terminal of the first LED stage and selectively connect the second power line to the output terminal of the second LED stage, to thereby concatenate the first and second LED stages between the first and second power lines during a positive half-cycle of the AC power applied to the first and second power lines, and (ii) selectively connect the second power line to the input terminal of the first LED stage and selectively connect the first power line to the output terminal of the second LED stage, to thereby concatenate the first and second LED stages between the second and first power lines during a negative half-cycle of the AC power applied to the first and second power lines.

4. The integrated circuit of claim 1, wherein:
the plurality of LED stages comprises a first LED stage and a second LED stage; and
the switch control circuitry is configured to control the switching circuitry to (i) selectively connect the first power line to the input terminals of the first and second LED stages and selectively connect the second power line to the output terminals of the first and second LED stages, to thereby connect the first and second LED stages in parallel between the first and second power lines during a positive half-cycle of the AC power applied to the first and second power lines, and (ii) selectively connect the second power line to the input terminals of the first and second LED stages and selectively connect the first power line to the output terminals of the first and second LED stages, to thereby connect the first and second LED stages in parallel between the second and first power lines during a negative half-cycle of the AC power applied to the first and second power lines.

5. The integrated circuit of claim 1, further comprising:
a zero-crossing detection circuit configured to detect zero-voltage crossings of an AC voltage waveform applied on the first and second power lines and output a detection signal which indicates a zero-crossing event and a direction of polarity transition of the AC voltage waveform;
wherein the switch control circuitry utilizes the output detection signal to control operation of the switching circuitry to empower one or more LED stages based on a voltage level of the applied AC power.

6. The integrated circuit of claim 1, wherein each LED stage comprises a same number of serially-connected LED devices.

7. The integrated circuit of claim 1, wherein at least two LED stages have different numbers of serially-connected LED devices.

8. The integrated circuit of claim 1, wherein each LED device has an operating range from about 2.8V to about 4.2V.

9. An LED lighting system comprising the integrated circuit of claim 1.

10. A device, comprising:
a semiconductor wafer comprising a monolithic integrated circuit, wherein the monolithic integrated circuit comprises:
alternating-current (AC) power input terminals configured for connection to an AC power source, and a first power line and a second power line coupled to respective ones of the AC power input terminals;
a plurality of light-emitting diode (LED) stages, wherein each LED stage comprises a plurality of LED devices that are serially connected between an input terminal and an output terminal of the LED stage, and wherein the LED stages are coupled in a chain with the input terminal of at least one LED stage coupled to the output terminal of another LED stage;
switching circuitry coupled to the first and second power lines and to the input and output terminals of each LED stage; and switch control circuitry configured to control the switching circuitry to (i) selectively connect the first power line and the second power line to the input terminal and the output terminal, respectively, of at least one LED stage during a positive half-cycle of AC power applied to the first and second power lines, and (ii) selectively connect the second power line and the first power line to the input terminal and the output terminal, respectively, of the at least one LED stage during a negative half-cycle of the AC power applied to the first and second power lines.

11. The device of claim 10, wherein the switch control circuitry is configured to execute a switch timing control program to synchronize operation of the switching circuitry to empower one or more LED stages based on a voltage level of the applied AC power.

12. The device of claim 10, wherein:
the plurality of LED stages comprises a first LED stage and a second LED stage, wherein the input terminal of the second LED stage is coupled to the output terminal of the first LED stage; and
the switch control circuitry is configured to control the switching circuitry to (i) selectively connect the first power line to the input terminal of the first LED stage and selectively connect the second power line to the output terminal of the second LED stage, to thereby concatenate the first and second LED stages between the first and second power lines during a positive half-cycle of AC power applied to the first and second power lines, and (ii) selectively connect the second power line to the input terminal of the first LED stage and selectively connect the first power line to the output terminal of the second LED stage, to thereby concatenate the first and second LED stages between the second and first power lines during a negative half-cycle of AC power applied to the first and second power lines.

13. The device of claim 10, wherein:
the plurality of LED stages comprises a first LED stage and a second LED stage; and
the switch control circuitry is configured to control the switching circuitry to (i) selectively connect the first power line to the input terminals of the first and second LED stages and selectively connect the second power line to the output terminals of the first and second LED stages, to thereby connect the first and second LED stages in parallel between the first and second power lines during a positive half-cycle of AC power applied to the first and second power lines, and (ii) selectively connect the second power line to the input terminals of the first and second LED stages and selectively connect the first power line to the output terminals of the first and second LED stages, to thereby connect the first and second LED stages in parallel between the second and first power lines during a negative half-cycle of AC power applied to the first and second power lines.

14. The device of claim 10, wherein the monolithic integrated circuit further comprises:
a zero-crossing detection circuit configured to detect zero-voltage crossings of an AC voltage waveform applied on the first and second power lines and output a detection signal which indicates a zero-crossing event and a direction of polarity transition of the AC voltage waveform;
wherein the switch control circuitry utilizes the output detection signal to control operation of the switching circuitry to empower one or more LED stages based on a voltage level of the applied AC power.

15. The device of claim 10, wherein each LED stage comprises a same number of serially-connected LED devices.

16. The device of claim 10, wherein at least two LED stages have different numbers of serially-connected LED devices.

17. The device of claim 10, wherein each LED device has an operating range from about 2.8V to about 4.2V.

18. The device of claim 10, wherein the monolithic integrated circuit further comprises at least one of (i) an optical filter disposed over each LED device, and (ii) a lens disposed over each LED device.

19. A method comprising:
  applying alternating-current (AC) power to first and second power lines of a light-emitting diode (LED) lighting element, wherein the LED lighting element comprises a plurality of LED stages, wherein each LED stage comprises a plurality of LED devices that are serially connected between an input terminal and an output terminal of the LED stage, and wherein the LED stages are coupled in a chain with the input terminal of at least one LED stage coupled to the output terminal of another LED stage; and
  empowering at least one LED stage of the plurality of LED stages during a positive half-cycle and a negative half-cycle of the applied AC power by (i) selectively connecting the first power line and the second power line to the input terminal and the output terminal, respectively, of the at least one LED stage during the positive half-cycle of the applied AC power, and (ii) selectively connecting the second power line and the first power line to the input terminal and the output terminal, respectively, of the at least one LED stage during the negative half-cycle of the applied AC power.

20. The method of claim 19, wherein empowering at least one LED stage of the plurality of LED stages during the positive half-cycle and the negative half-cycle of the applied AC power comprises:

empowering two or more LED stages of the plurality of LED stages during the positive half-cycle and the negative half-cycle of the applied AC power by (i) selectively connecting the first power line to the input terminals of the two or more LED stages and selectively connecting the second power line to the output terminals of the two or more LED stages, to thereby connect the two or more LED stages in parallel between the first and second power lines during the positive half-cycle of applied AC power, and (ii) selectively connecting the second power line to the input terminals of the two or more LED stages and selectively connecting the first power line to the output terminals of the two or more LED stages, to thereby connect the two or more LED stages in parallel between the second and first power lines during the negative half-cycle of the applied AC power; and empowering two or more LED stages of the plurality of LED stages during the positive half-cycle and the negative half-cycle of the applied AC power by (i) selectively connecting the first power line to the input terminal of a first LED stage and selectively connecting the second power line to the output terminal of the second LED stage, to thereby serially connect a chain of LED stages, which comprises the first and second LED stages, between the first and second power lines during the positive half-cycle of applied AC power, and (ii) selectively connecting the second power line to the input terminal of the first LED stage and selectively connecting the first power line to the output terminal of the second LED stage, to thereby serially connect the chain of LED stages, which comprises the first and second LED stages, between the second and first power lines during the negative half-cycle of applied AC power.

* * * * *